US009465150B2

(12) United States Patent
Fukagawa et al.

(10) Patent No.: US 9,465,150 B2
(45) Date of Patent: Oct. 11, 2016

(54) PROTECTIVE FILM FOR POLARIZING PLATE, POLARIZING PLATE AND LIQUID CRYSTAL DISPLAY DEVICE

(71) Applicant: FUJIFILM Corporation, Tokyo (JP)

(72) Inventors: Nobutaka Fukagawa, Kanagawa (JP); Naoyoshi Yamada, Kanagawa (JP); Aiko Yoshida, Kanagawa (JP); Yukie Watanabe, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 88 days.

(21) Appl. No.: 14/141,699

(22) Filed: Dec. 27, 2013

(65) Prior Publication Data

US 2014/0185135 A1 Jul. 3, 2014

(30) Foreign Application Priority Data

Dec. 27, 2012 (JP) ................................ 2012-286364

(51) Int. Cl.
*G02B 5/20* (2006.01)
*G02B 5/22* (2006.01)
(Continued)

(52) U.S. Cl.
CPC ............... *G02B 5/208* (2013.01); *B32B 23/04* (2013.01); *B32B 23/20* (2013.01); *G02B 5/223* (2013.01);
(Continued)

(58) Field of Classification Search
CPC .......... G02B 1/04; G02B 1/10; G02B 1/105; G02B 1/14; G02B 5/208; G02B 5/22; G02B 5/223; G02B 5/3025–5/3058; G02B 27/288; B32B 23/04; B32B 23/20; B32B 2307/412; B32B 2307/42; B32B 2307/536; B32B 2307/584; B32B 2307/71; B32B 2457/20; B32B 2457/202; C09D 7/1241
USPC .......................... 359/350, 352, 361, 483.01, 359/485.01–485.06, 487.01–487.06, 491.01
See application file for complete search history.

(56) References Cited

U.S. PATENT DOCUMENTS 7,749,578 B2 * 7/2010 Oka et al. .................... 428/1.33
8,922,889 B2 * 12/2014 Fukagawa et al. ...... 359/483.01
(Continued)

FOREIGN PATENT DOCUMENTS

JP 2008-281680 A 11/2008
JP 2009-096971 A 5/2009
(Continued)

OTHER PUBLICATIONS

Heita, JP 2011-203400 A, Oct. 13, 2011, English Language Machine Translation, created Nov. 30, 2015.*
(Continued)

*Primary Examiner* — Stephone B Allen
*Assistant Examiner* — Adam W Booher
(74) *Attorney, Agent, or Firm* — Jean C. Edwards, Esq.; Edwards Neils LLC

(57) ABSTRACT

A protective film for polarizing plate contains a resin, an ultraviolet absorbing agent A having an absorption maximum in a wavelength range of from 350 to 400 nm and an ultraviolet absorbing agent B having an absorption maximum in a wavelength range of from 270 to 330 nm, and a content of the ultraviolet absorbing agent A is from 0.1 to 5% by weight relative to the resin, a content of the ultraviolet absorbing agent B is from 0.1 to 5% by weight relative to the resin, and the protective film fulfills the requirements (a) to (d) as defined herein.

10 Claims, 1 Drawing Sheet

(51) Int. Cl.
*B32B 23/04* (2006.01)
*B32B 23/20* (2006.01)

(52) U.S. Cl.
CPC ...... *B32B 2307/412* (2013.01); *B32B 2307/42* (2013.01); *B32B 2307/536* (2013.01); *B32B 2307/584* (2013.01); *B32B 2307/71* (2013.01); *B32B 2457/20* (2013.01); *B32B 2457/202* (2013.01)

(56) References Cited

U.S. PATENT DOCUMENTS

| | | | | |
|---|---|---|---|---|
| 2002/0192397 | A1* | 12/2002 | Tsujimoto | 428/1.31 |
| 2006/0093759 | A1* | 5/2006 | Fukagawa | C08J 5/18 428/1.31 |
| 2009/0192239 | A1* | 7/2009 | Hecht et al. | 522/166 |
| 2010/0076124 | A1 | 3/2010 | Yawata et al. | |
| 2010/0210762 | A1 | 8/2010 | Hanaki et al. | |
| 2011/0229662 | A1 | 9/2011 | Kamee et al. | |

FOREIGN PATENT DOCUMENTS

| | | | |
|---|---|---|---|
| JP | 2009-209343 | A | 9/2009 |
| JP | 2011-186358 | A | 9/2011 |
| JP | 2011-203400 | A | 10/2011 |

OTHER PUBLICATIONS

"TOPAS: Cyclic Olefin Copolymer," TOPAS Advanced Polymers, published Apr. 2011, http://www.topas.com/sites/default/files/files/TOPAS_Brochure_E_2014_06(1).pdf, Accessed May 31, 2016.*

Notice of Reasons for Rejection issued by the Japanese Patent Office (JPO) on Mar. 31, 2015 in connection with Japanese Patent Application No. 2013-268053.

* cited by examiner

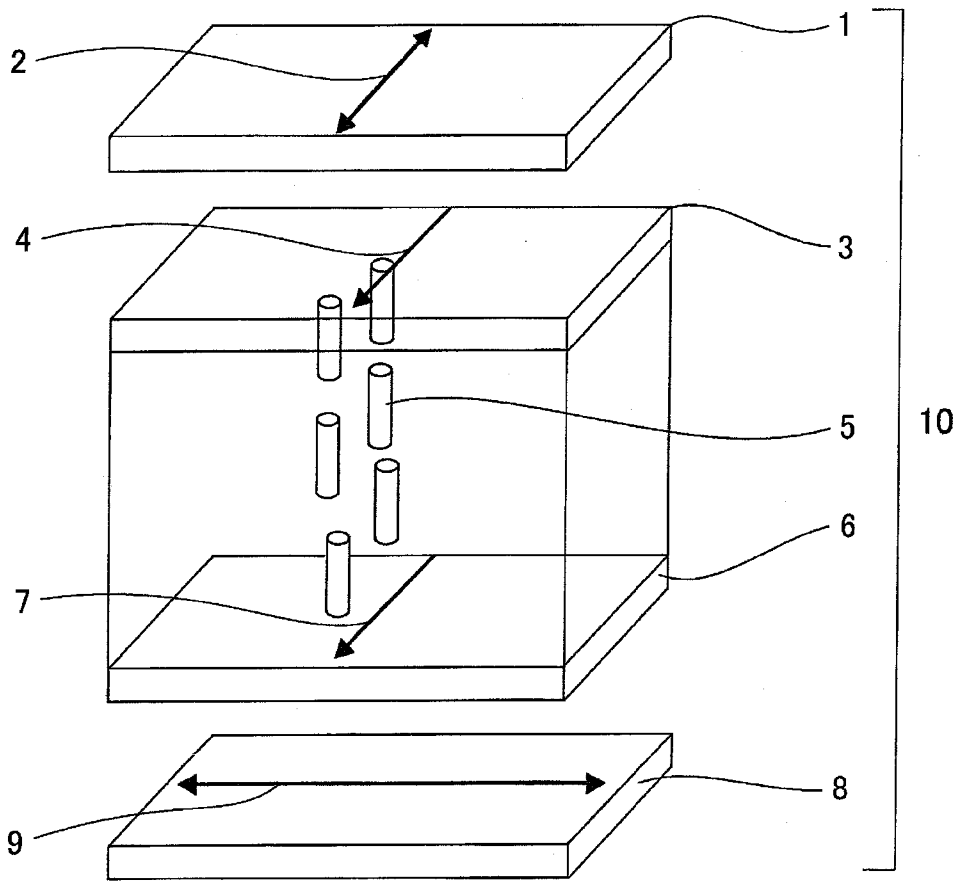
1
2
3
4
5
10
6
7
8
9

PROTECTIVE FILM FOR POLARIZING PLATE, POLARIZING PLATE AND LIQUID CRYSTAL DISPLAY DEVICE

CROSS-REFERENCE TO RELATED APPLICATIONS

This application claims the benefit of Japanese Patent Application JP 2012-286364, filed Dec. 27, 2012, the entire content of which is hereby incorporated by reference, the same as if set forth at length.

FIELD OF THE INVENTION

The present invention relates to a protective film for polarizing plate, a polarizing plate and a liquid crystal display device.

BACKGROUND OF THE INVENTION

A liquid crystal display device has been used widely more and more year by year as a space-saving image display device having low power consumption. With the expansion of the market for so-called mobile usage, for example, a mobile phone or a tablet PC, in addition to the market in which an image of high definition is required, for example, a television set, the need for reduction in thickness of the device has been increased more and more.

The basic constitution of liquid crystal display device comprises polarizing plates disposed on the both sides of a liquid crystal cell. Since the polarizing plate takes a role for passing only light of polarization in the definite direction, the performance of liquid crystal display device is greatly influenced with the performance of the polarizing plate. The polarizing plate ordinarily has a constitution of a polarizer comprising, for example, a polyvinyl alcohol film in which iodine or a dye is adsorbed and oriented and transparent protective films (protective films for polarizing plate) stuck on the front and rear sides of the polarizer.

When the polarizer or liquid crystal cell is exposed to an ultraviolet light, the polarizer or liquid crystal molecule is decomposed to deteriorate the display performance and thus, a method for inhibiting transmission of the ultraviolet light has been adopted by adding an ultraviolet absorbing agent to the protective film for polarizing plate.

However, in order to control the transmittance of ultraviolet light in a low level in the protective film for polarizing plate having a small thickness, it is necessary to add an ultraviolet absorbing agent in a high concentration to cause a problem of bleed out of the ultraviolet absorbing agent or an adverse effect on the physical property of film and thus, the improvement has been requested.

In JP-A-2009-209343 (the term "JP-A" as used herein means an "unexamined published Japanese patent application") and JP-A-2009-96971, an ultraviolet absorbing agent having a maximum absorption wavelength in a wavelength range longer than 360 nm is disclosed.

In JP-A-2011-186358 and JP-A-2008-281680, a cellulose acylate film to which the ultraviolet absorbing agent described in JP-A-2009-209343 or JP-A-2009-96971 is added is disclosed.

SUMMARY OF THE INVENTION

However, as to the cellulose acylate film described in JP-A-2011-186358 or JP-A-2008-281680, it is difficult to make a balance between scratch resistance and light fastness in some cases in the case of reducing the thickness of film.

An object of the present invention is to provide a protective film for polarizing plate which has a low water vapor transmission rate per film thickness, is excellent in transparency and scratch resistance, hardly causes yellowish coloration and increases light fastness of the polarizing plate, a polarizing plate including the protective film for polarizing plate, and a liquid crystal display device including the polarizing plate.

The inventors have found that the deterioration in polarization performance of a polarizer due to an ultraviolet light can be effectively improved by restraining photoexcitation of $I_3^-$ having an absorption maximum at a wavelength of approximately 300 nm and photoexcitation of $I_3^-.I_2$ complex having an absorption maximum at a wavelength of approximately 360 nm. Specifically, it is known that the iodine complex in a polarizer exists in an equilibrium relation as shown below. Due to decomposition of the $I_3^-$ and $I_3^-.I_2$ complex the equilibrium shown in formula (I) shifts to the left so that the existing amounts of ($I_3^-$-PVA) complex and ($I_5^-$-PVA) complex decrease and as a result, the polarization performance resulting from the ($I_3^-$-PVA) complex having an absorption maximum at a wavelength of approximately 480 nm and the polarization performance resulting from the ($I_5^-$-PVA) complex having an absorption maximum at a wavelength of approximately 600 nm are deteriorated.

Formula (I)

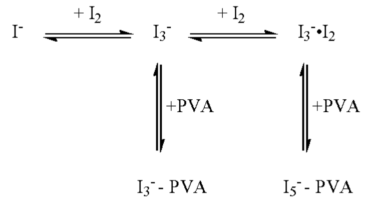

With respect to the problem, the inventors have found that the deterioration in polarization performance due to an ultraviolet light can be improved to a large extent by a combination of an ultraviolet absorbing agent A having an absorption maximum in a wavelength range from 350 to 400 nm and an ultraviolet absorbing agent B having an absorption maximum in a wavelength range from 270 to 330 nm.

Further, the inventors have found that the protective film for polarizing plate which has a low water vapor transmission rate per film thickness, is excellent in transparency and scratch resistance, and hardly causes yellowish coloration is obtained so that light fastness of the polarizing plate can be increased by a protective film for polarizing plate which contains a resin, an ultraviolet absorbing agent A having an absorption maximum in a wavelength range from 350 to 400 nm and an ultraviolet absorbing agent B having an absorption maximum in a wavelength range from 270 to 330 nm, wherein a content of the ultraviolet absorbing agent A is from 0.1 to 5% by weight relative to the resin and a content of the ultraviolet absorbing agent B is from 0.1 to 5% by weight relative to the resin, and which fulfills requirements (a) to (d) shown below:

(a) a film thickness is from 5 to 40 μm, (b) a transmittance at a wavelength of 300 nm is 2% or less, (c) a transmittance at a wavelength of 380 nm is 4% or less, (d) a surface hardness measured by using a Knoop indenter at an indentation load of 50 mN is 210 $N/mm^2$ or more.

Specifically, the problems described above can be solved by the means described below.

(1) A protective film for polarizing plate which contains a resin, an ultraviolet absorbing agent A having an absorption maximum in a wavelength range from 350 to 400 nm and an ultraviolet absorbing agent B having an absorption maximum in a wavelength range from 270 to 330 nm, wherein a content of the ultraviolet absorbing agent A is from 0.1 to 5% by weight relative to the resin and a content of the ultraviolet absorbing agent B is from 0.1 to 5% by weight relative to the resin, and which fulfills requirements (a) to (d) shown below:

(a) a thickness is from 5 to 40 μm, (b) a transmittance at a wavelength of 300 nm is 2% or less, (c) a transmittance at a wavelength of 380 nm is 4% or less, (d) a surface hardness measured by using a Knoop indenter at an indentation load of 50 mN is 210 $N/mm^2$ or more.

(2) The protective film for polarizing plate as described in (1) above, wherein both the ultraviolet absorbing agent A and the ultraviolet absorbing agent B do not contain a straight-chain alkyl group having 8 or more carbon atoms.

(3) The protective film for polarizing plate as described in (1) or (2) above, wherein the resin is a cellulose acylate.

(4) The protective film for polarizing plate as described in any one of (1) to (3) above, which contains a compound represented by formula (I) shown below.

Formula (I)

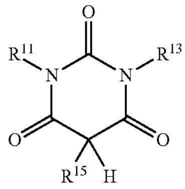

In formula (I), $R^{11}$, $R^{13}$ and $R^{15}$ each independently represents a hydrogen atom, an alkyl group having from 1 to 20 carbon atoms, a cycloalkyl group having from 3 to 20 carbon atoms, an alkenyl group having from 2 to 20 carbon atoms or an aromatic group having from 6 to 20 carbon atoms, provided that a total of 3 or more ring structures are present in $R^{11}$, $R^{13}$ and $R^{15}$.

(5) The protective film for polarizing plate as described in any one of (1) to (4) above, which contains a compound represented by formula (II) shown below.

Formula (II)

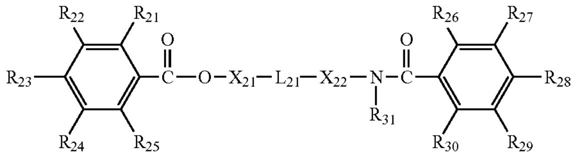

In formula (H), $R_{21}$ to $R_{27}$ and $R_{29}$ to $R_{31}$ each independently represents a hydrogen atom or a substituent, $R_{28}$ represents a hydrogen atom or a non-conjugated substituent, $X_{21}$ and $X_{22}$ each independently represents a single bond or an aliphatic connecting group, $L_{21}$ represents a single bond, $-N(R_{32})-$ or $-C(R_{33})(R_{34})-$, and $R_{32}$ to $R_{34}$ each independently represents a hydrogen atom or a substituent.

(6) The protective film for polarizing plate as described in any one of (1) to (5) above, wherein the ultraviolet absorbing agent A is a compound represented by formula (1) shown below.

Formula (1)

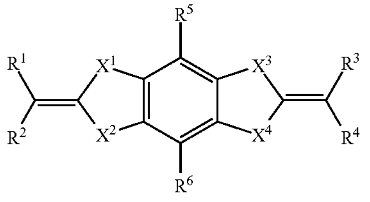

In formula (1), $R^1$, $R^2$, $R^3$ and $R^4$ each independently represents a hydrogen atom or a monovalent substituent, $R^5$ and $R^6$ each independently represents a hydrogen atom or a monovalent substituent, and $X^1$, $X^2$, $X^3$ and $X^4$ each independently represents a hetero atom.

(7) The protective film for polarizing plate as described in any one of (1) to (5) above, wherein the ultraviolet absorbing agent A is a compound represented by formula (4) shown below.

Formula (4)

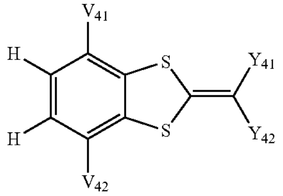

In formula (4), $Y_{41}$ and $R_{42}$ each independently represents a hydrogen atom or a monovalent substituent, and $V_{41}$ and $V_{42}$ each independently represents a hydrogen atom or a monovalent substituent.

(8) The protective film for polarizing plate as described in any one of (1) to (7) above, wherein the ultraviolet absorbing agent B is a benzotriazole compound, a benzophenone compound or a triazine compound.

(9) The protective film for polarizing plate as described in any one of (1) to (8) above, wherein a chromaticness index b* of the protective film for polarizing plate in a L*a*b* color system is from 0.1 to 0.7.

(10) A polarizing plate including at least one sheet of the protective film for polarizing plate as described in any one of (1) to (9) above.

(11) A liquid crystal display device including at least one sheet of the polarizing plate as described in (10) above.

According to the present invention, a protective film for polarizing plate which has a low water vapor transmission rate per film thickness, is excellent in transparency and scratch resistance, hardly causes yellowish coloration and increases light fastness of the polarizing plate, a polarizing plate including the protective film for polarizing plate, and a liquid crystal display device including the polarizing plate can be provided.

BRIEF DESCRIPTION OF THE DRAWINGS

FIG. 1 is a view schematically showing an example of the liquid crystal display device according to the invention.

DESCRIPTION OF REFERENCE NUMERALS AND SIGNS

1 Upper polarizing plate
2 Direction of absorption axis of upper polarizing plate
3 Liquid crystal cell upper electrode substrate
4 Upper substrate orientation control direction
5 Liquid crystal layer
6 Liquid crystal cell lower electrode substrate
7 Lower substrate orientation control direction
8 Lower polarizing plate
9 Direction of absorption axis of lower polarizing plate
10 Liquid crystal display device

DETAILED DESCRIPTION OF THE INVENTION

Protective Film for Polarizing Plate

The protective film for polarizing plate according to the invention is a protective film for polarizing plate which contains a resin, an ultraviolet absorbing agent A having an absorption maximum in a wavelength range from 350 to 400 nm and an ultraviolet absorbing agent B having an absorption maximum in a wavelength range from 270 to 330 nm, wherein a content of the ultraviolet absorbing agent A is from 0.1 to 5% by weight relative to the resin and a content of the ultraviolet absorbing agent B is from 0.1 to 5% by weight relative to the resin, and which fulfills requirements (a) to (d) shown below:

(a) a thickness is from 5 to 40 μm,
(b) a transmittance at a wavelength of 300 nm is 2% or less,
(c) a transmittance at a wavelength of 380 nm is 4% or less,
(d) a surface hardness measured by using a Knoop indenter at an indentation load of 50 mN is 210 $N/mm^2$ or more.

(Resin)

The protective film for polarizing plate according to the invention contains a resin and is preferably a resin in the form of a film.

The resin which can be used in the protective film for polarizing plate is a known resin and is not particularly restricted as long as it is not contrary to the gist of the invention. Examples of the resin include a cellulose acylate resin, an acrylic resin and a cycloolefin resin, and of the resins a cellulose acylate resin is preferred.

(Ultraviolet Absorbing Agent)

The protective film for polarizing plate according to the invention contains an ultraviolet absorbing agent (ultraviolet absorbing agent A) having an absorption maximum in a wavelength range from 350 to 400 nm and an ultraviolet absorbing agent (ultraviolet absorbing agent B) having an absorption maximum in a wavelength range from 270 to 330 nm.

The ultraviolet absorbing agent preferably not contains a straight-chain alkyl group having 8 or more carbon atoms. The ultraviolet absorbing agent not containing a straight-chain alkyl group having 8 or more carbon atoms has a large effect on reducing a water vapor transmission rate and can enhance hardness.

First, the ultraviolet absorbing agent A is described in detail.

(Ultraviolet Absorbing Agent A)

The ultraviolet absorbing agent A has an absorption maximum in a wavelength range from 350 to 400 nm. As the ultraviolet absorbing agent A, for example, a light absorbing agent selected from any of merocyanine series, benzodithiol series and benzoxazole series can be preferably used. Specifically, light absorbing agents described, for example, in JP-A-2010-70478 and JP-T-2009-519993 can be referred to. Ultraviolet absorbing agents described in Paragraph Nos. [0019] to [0046] of JP-A-2009-67973 and ultraviolet absorbing agents described in Paragraph Nos. [0014] to [0024] of JP-A-2009-292753 are also preferred.

A compound represented by formula (1) shown below is particularly preferred as the ultraviolet absorbing agent A according to the invention.

Formula (1)

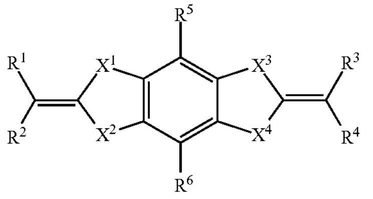

In formula (1), $R^1$, $R^2$, $R^3$ and $R^4$ each independently represents a hydrogen atom or a monovalent substituent, $R^5$ and $R^6$ each independently represents a hydrogen atom or a monovalent substituent, and $X_1$, $X^2$, $X^3$ and $X^4$ each independently represents a hetero atom.

The compound represented by formula (1) is described in Paragraph Nos. [0020] to [0097] of JP-A-2009-209343 and is same in the invention, but it is preferred in the invention that the compound represented by formula (1) does not contain a straight-chain alkyl group having 8 or more carbon atoms.

In formula (1), in the case where $R^1$, $R^2$, $R^3$ and $R^4$ each independently represents a monovalent substituent, the monovalent substituent is preferably a cyano group, a carboxyl group, an alkoxycarbonyl group, an aryloxycarbonyl group, a carbamoyl group, an alkylcarbonyl group, an arylcarbonyl group, an alkylsulfonyl group or an arylsulfonyl group, more preferably a cyano group, a carboxyl group, an alkoxycarbonyl group, an aryloxycarbonyl group, a carbamoyl group or an alkylcarbonyl group, and still more preferably a cyano group or an alkoxycarbonyl group. A number of carbon atoms included in $R^1$ to $R^4$ is preferably from 1 to 20, and more preferably from 1 to 10.

In formula (1), in the case where $R^5$ and $R^6$ each independently represents a monovalent substituent, the monovalent substituent is preferably a halogen atom, an alkyl group, an aryl group, a cyano group, a carboxyl group, an alkoxycarbonyl group, an aryloxycarbonyl group, a carbamoyl group, an alkylcarbonyl group, an arylcarbonyl group, a nitro group, an amino group, an acylamino group, a sulfonamido group, a hydroxy group, an alkoxy group, an aryloxy group, an acyloxy group, an alkylsulfonyloxy group, an arylsulfonyloxy group, a sulfo group, an alkylthio group or an arylthio group, more preferably an alkoxycarbonyl group, an aryloxycarbonyl group, a carbamoyl group, an alkylcarbonyl group, an arylcarbonyl group, an aryloxy group or an acyloxy group, and still more preferably an alkoxycarbonyl group, an aryloxycarbonyl group, a carbamoyl group, an alkylcarbonyl group, an arylcarbonyl group or an acyloxy group. A number of carbon atoms included in $R^5$ and $R^6$ is preferably from 1 to 20, and more preferably from 1 to 10.

In formula (1), the hetero atom represented by $X^1$, $X^2$, $X^3$ or $X^4$ is preferably a boron atom, a nitrogen atom, an oxygen atom, a silicon atom, a phosphorus atom, a sulfur atom, a selenium atom or a tellurium atom, more preferably a nitrogen atom, an oxygen atom or a sulfur atom, still more preferably a nitrogen atom or a sulfur atom, and particularly preferably a sulfur atom.
Specific examples of the compound represented by formula (1) are set forth below, but the compound represented by formula (1) should not be construed as being limited to the specific examples set forth below.
(1)
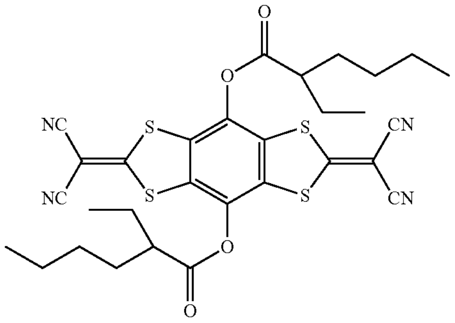
(2)
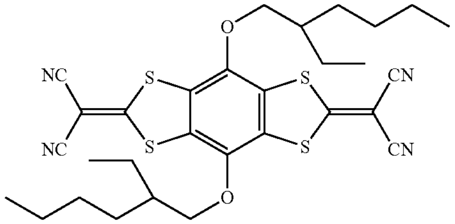
(3)
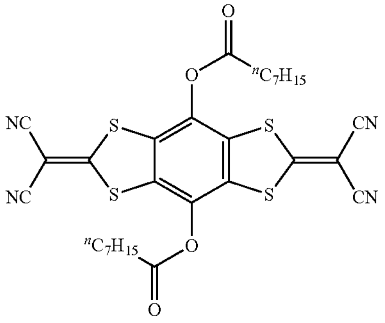
(4)
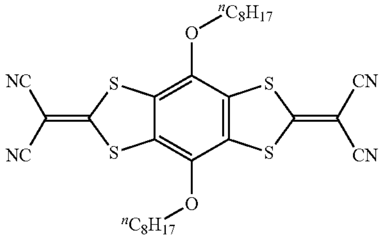
(5)
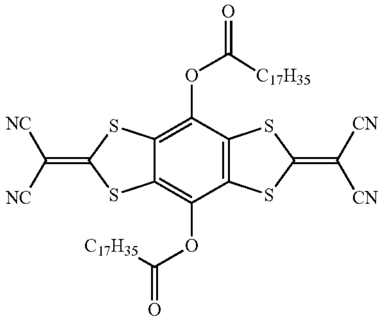
-continued
(6)
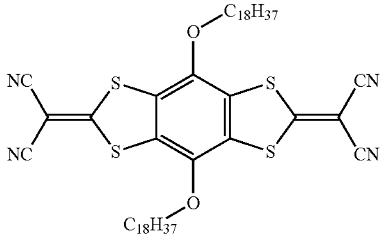
(7)
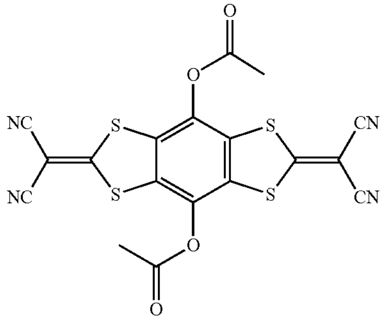
(8)
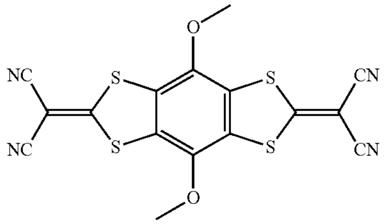
(9)
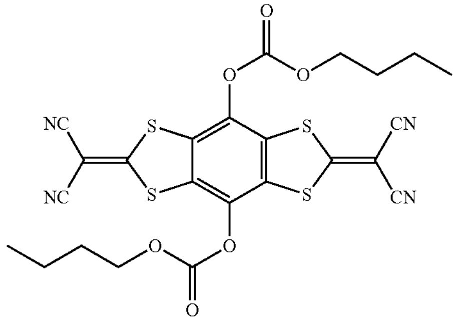
(10)
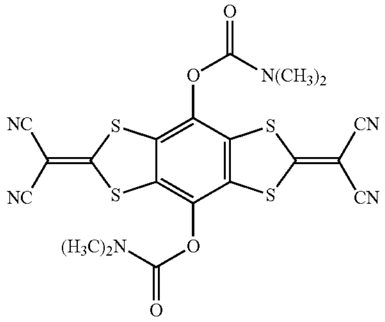

-continued
(11)
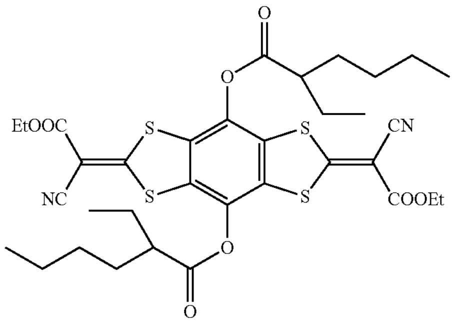
(12)
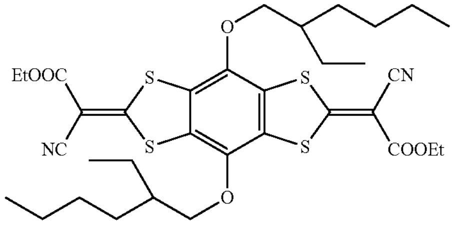
(13)
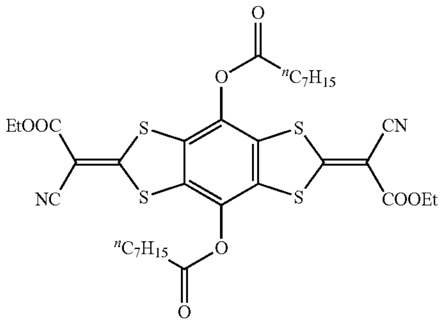
(14)
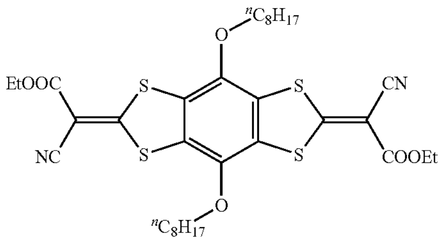
(15)
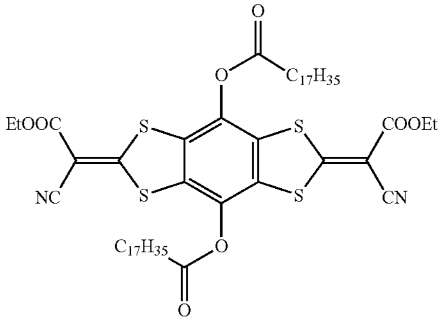
-continued
(16)
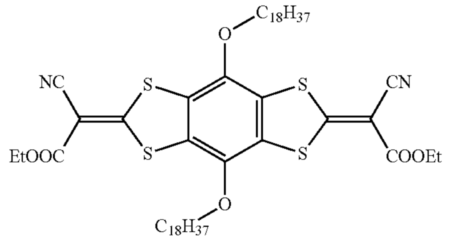
(17)
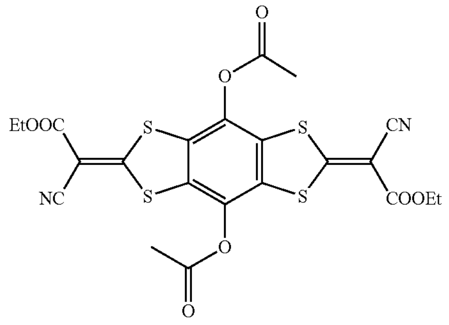
(18)
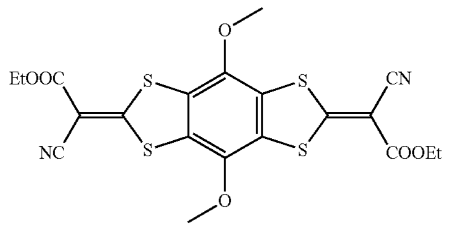
(19)
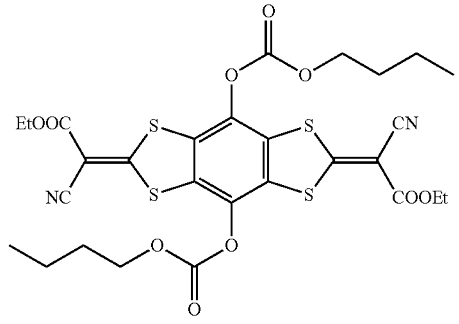
(20)
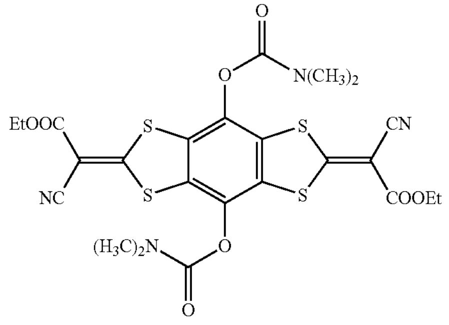
The ultraviolet absorbing agent A is also preferably a compound represented by formula (4) shown below.

Formula (4)

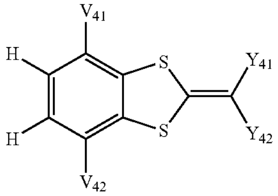

In formula (4), $Y_{41}$ and $R_{42}$ each independently represents a hydrogen atom or a monovalent substituent, and $V_{41}$ and $V_{42}$ each independently represents a hydrogen atom or a monovalent substituent.

The compound represented by formula (4) is described in Paragraph Nos. [0037] to [0062] of JP-A-2009-96972 and is same in the invention, but it is preferred in the invention that the compound represented by formula (4) does not contain a straight-chain alkyl group having 8 or more carbon atoms.

In formula (4), it is preferred that one of $Y_{41}$ and $R_{42}$ is a cyano group and the other is a substituted or unsubstituted alkylcarbonyl group, a substituted or unsubstituted arylcarbonyl group, a substituted or unsubstituted heterocyclic carbonyl group, a substituted or unsubstituted alkylsulfonyl group or an substituted or unsubstituted arylsulfonyl group. It is more preferred that one of $Y_{41}$ and $R_{42}$ is a cyano group and the other is a substituted or unsubstituted alkylcarbonyl group, a substituted or unsubstituted arylcarbonyl group or a substituted or unsubstituted heterocyclic carbonyl group. It is still more preferred that one of $Y_{41}$ and $R_{42}$ is a cyano group and the other is a substituted or unsubstituted alkylcarbonyl group or a substituted or unsubstituted arylcarbonyl group.

In formula (4), in the case where $V_{41}$ and $V_{42}$ each independently represents a monovalent substituent, the monovalent substituent is preferably a halogen atom, a mercapto group, a cyano group, a carboxyl group, a phosphoric acid group, a sulfo group, a hydroxy group, a carbamoyl group, a sulfamoyl group, a nitro group, an alkoxy group, an aryloxy group, an acyl group, an acyloxy group, an acylamino group, an alkylaminocarbonyloxy group, a sulfonyl group, a sulfinyl group, a sulfonylamino group, an amino group, a substituted amino group, an ammonium group, a hydrazino group, a ureido group, an imido group, an alkyl- or aryl-thio group, a substituted or unsubstituted alkenylthio group, an alkoxycarbonyl group, an aryloxycarbonyl group, an alkoxycarbonylthio group, an unsubstituted alkyl group, a substituted alkyl group, a substituted or unsubstituted aryl group or a substituted or unsubstituted heterocyclic group, more preferably a cyano group, an acyl group, an acyloxy group or an alkylaminocarbonyloxy group, and still more preferably an acyloxy group or an alkylaminocarbonyloxy group. A number of carbon atoms included in $Y_{41}$ and $R_{42}$ is preferably from 1 to 18, and more preferably from 1 to 10.

Specific examples of the compound represented by formula (4) are set forth below, but the compound represented by formula (4) should not be construed as being limited to the specific examples set forth below.

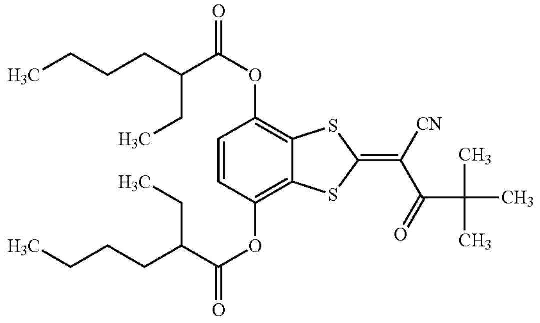

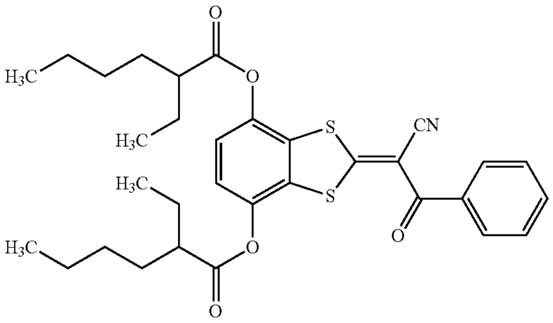

(S-03)

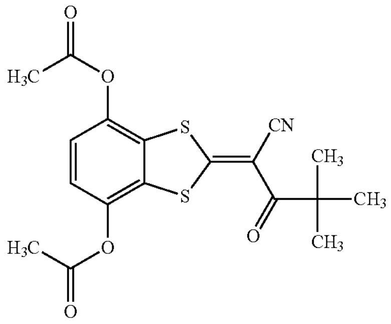

(S-04)

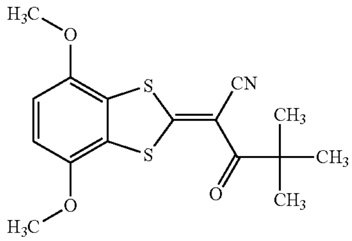

(S-05)

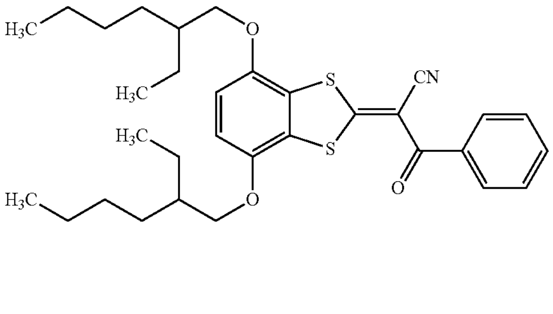

-continued (S-06)

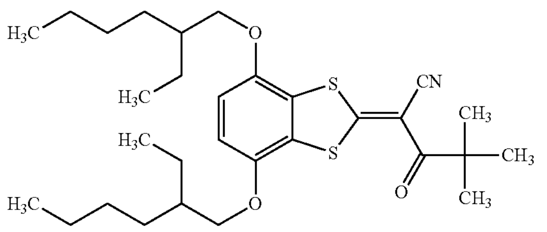

(S-11)

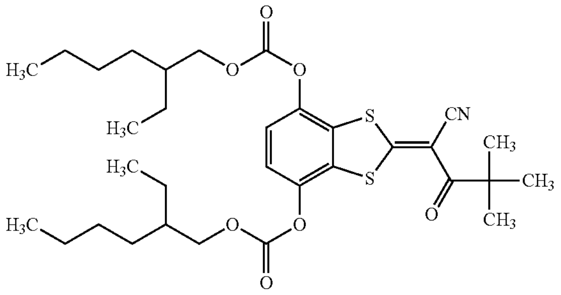

(S-12)

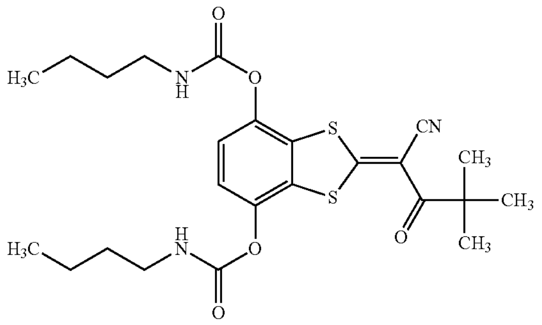

(S-13)

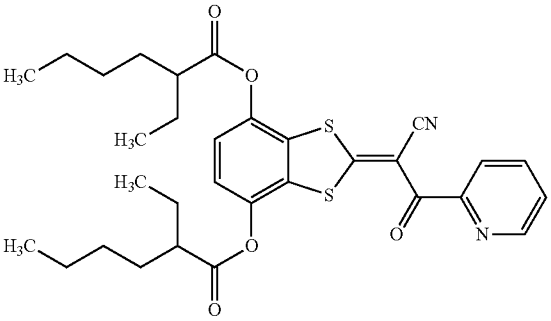

(S-14)

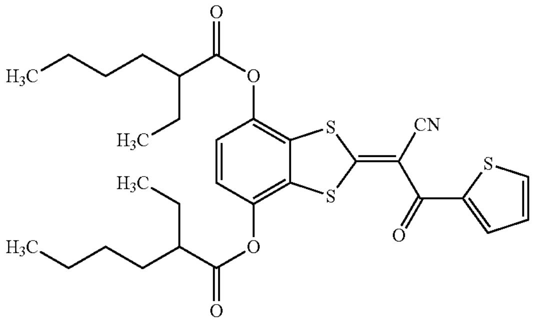

-continued (S-15)

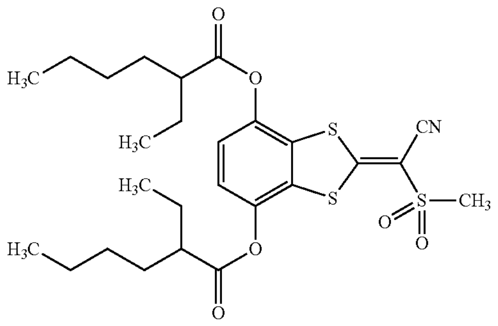

(S-16)

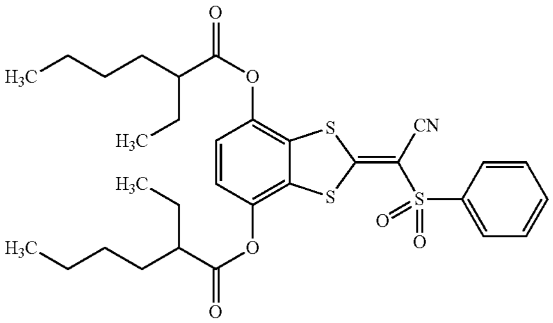

It is preferred that the ultraviolet absorbing agent A has an absorption maximum in a wavelength range from 350 to 400 nm and a molar extinction coefficient in a wavelength range longer than 400 nm of the ultraviolet absorbing agent A is 1,000 or less. The film having less yellowish tint can be obtained by using the ultraviolet absorbing agent A having no absorption in a wavelength range longer than 400 nm.

The yellowish tint of the film is preferably evaluated by using a lightness index L* and chromaticness indexes a* and b* in the L*a*b* color system. The definitions of L*, a* and b* are described, for example, in *Shikisai Kogaku* (*Color Optics*), Tokyo Denki University Press. The b* in the protective film for polarizing plate according to the invention is preferably from 0.1 to 0.7, more preferably from 0.1 to 0.6, and still more preferably from 0.1 to 0.5. By controlling the value of the b* in the range described above, when the protective film for polarizing plate is installed in a liquid crystal display device, the display device excellent in color reproducibility can be obtained.

A method for determining the b* is described below.

Lightness index: $L^*=116(Y/Yn)^{13}-16$ $$a^*=500\{(X/Xn)^{1/3}-(Y/Yn)^{1/3}\}$$

$$b^*=200\{(Y/Yn)^{1/3}-(Z/Zn)^{1/3}\}$$

$$Y/Yn>0.008856$$

$$X/Xn>0.008856$$

$$Z/Zn>0.008856$$

wherein X, Y and Z represent tristimulus values in a XYZ color system of a sample, respectively.

Xn, Yn and Zn represent tristimulus values of a perfect reflecting diffuser, respectively. When X/Xn, Y/Yn or Z/Zn is 0.008856 or less, the calculation can be made by substituting the corresponding cube roots in the formulae above with any of the formulae shown below, respectively.

$$(X/Xn)^{1/3} \rightarrow 7.787(X/Xn)+16/116$$

$$(Y/Yn)^{1/3} \rightarrow 7.787(Y/Yn)+16/116$$

$$(Z/Zn)^{1/3} \rightarrow 7.787(Z/Zn)+16/116$$

The protective film for polarizing plate according to the invention contains the ultraviolet absorbing agent A in an amount from 0.1 to 5% by weight relative to the resin. By controlling the content of the ultraviolet absorbing agent A in the range described above, the ultraviolet ray corresponding to an absorption of the $I_2.I_3^-$ complex in the polarizer can be effectively blocked without impairing the transparency in a visible region wavelength. The content of the ultraviolet absorbing agent A is preferably from 0.5 to 4.0% by weight, more preferably from 1.5 to 3.5% by weight, relative to the resin.

(Ultraviolet Absorbing Agent B)

The ultraviolet absorbing agent B has an absorption maximum in a wavelength range from 270 to 330 nm.

The ultraviolet absorbing agent B is preferably a benzotriazole compound, a benzophenone compound or a triazine compound, and more preferably a benzotriazole compound.

Benzotriazole ultraviolet absorbing agents described in Paragraph Nos. [0018] to [0031] of JP-A-2007-326972 are preferred as the ultraviolet absorbing agent B.

Benzophenone ultraviolet absorbing agents described in Paragraph Nos. [0132] to [0151] of JP-A-2005-154764 are preferred as the ultraviolet absorbing agent B.

Triazine ultraviolet absorbing agents described in Paragraph Nos. [0042] to [0081] of JP-A-2012-136019 are preferred as the ultraviolet absorbing agent B.

The protective film for polarizing plate according to the invention contains the ultraviolet absorbing agent B in an amount from 0.1 to 5% by weight relative to the resin. By controlling the content of the ultraviolet absorbing agent B in the range described above, the ultraviolet ray corresponding to an absorption of the $I_3^-$ complex in the polarizer can be effectively blocked without impairing the transparency in a visible region wavelength. The content of the ultraviolet absorbing agent B is preferably from 0.2 to 4.0% by weight, more preferably from 0.5 to 3.5% by weight, relative to the resin.

The total content of the ultraviolet absorbing agent A and the ultraviolet absorbing agent B is preferably from 0.5 to 5% by weight relative to a main component resin constituting the protective film for polarizing plate (the main component resin means a resin having the largest content weight ratio of the resins contained in the protective film for polarizing plate). When the total content is 0.5% by weight or more, the effect of improving light fastness of the polarizing plate is apt to be obtained, whereas when it is 5% by weight or less, the bleed out or leaching hardly occurs in the film formation of the protective film for polarizing plate. The total content of the ultraviolet absorbing agent A and the ultraviolet absorbing agent B is more preferably from 1 to 5% by weight, and particularly preferably from 1 to 4% by weight.

(Hardness Increasing Agent)

In the protective film for polarizing plate according to the invention, a compound represented by formula (I) shown below is preferably used as a hardness increasing agent. In particular, in the case where the resin constituting the protective film for polarizing plate is a cellulose acylate, a compound represented by formula (I) shown below is preferably used as a hardness increasing agent.

Formula (I)

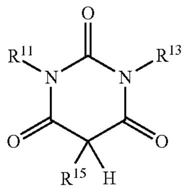

In formula (I), $R^{11}$, $R^{13}$ and $R^{15}$ each independently represents a hydrogen atom, an alkyl group having from 1 to 20 carbon atoms, a cycloalkyl group having from 3 to 20 carbon atoms, an alkenyl group having from 2 to 20 carbon atoms or an aromatic group having from 6 to 20 carbon atoms, provided that a total of 3 or more ring structures are present in $R^{11}$, $R^{13}$ and $R^{15}$.

The alkyl group having from 1 to 20 carbon atoms usable for any one of $R^{11}$, $R^{13}$ and $R^{15}$ has preferably from 1 to 10 carbon atoms, more preferably from 1 to 5 carbon atoms, still more preferably from 1 to 3 carbon atoms, and is particularly preferably a methyl group or an ethyl group.

The cycloalkyl group having from 3 to 20 carbon atoms usable for any one of $R^{11}$, $R^{13}$ and $R^{15}$ has preferably from 3 to 10 carbon atoms, and more preferably from 4 to 8 carbon atoms. Specific examples of the cycloalkyl group include a cyclopropyl group, a cyclopentyl group or a cyclohexyl group, and a cyclohexyl group is particularly preferred.

The alkenyl group having from 2 to 20 carbon atoms usable for any one of $R^{11}$, $R^{13}$ and $R^{15}$ has preferably from 2 to 10 carbon atoms, and more preferably from 2 to 5 carbon atoms.

The aromatic group having from 6 to 20 carbon atoms usable for any one of $R^{11}$, $R^{13}$ and $R^{15}$ may be either an aromatic hydrocarbon group or an aromatic heterocyclic group, and is preferably an aromatic hydrocarbon group. As the aromatic hydrocarbon group, a phenyl group or a naphthyl group is preferred, and a phenyl group is more preferred.

The group represented by any one of $R^{11}$, $R^{13}$ and $R^{15}$ may have a substituent. The substituent is not particularly restricted and includes an alkyl group (preferably an alkyl group having from 1 to 10 carbon atoms, for example, methyl, ethyl, isopropyl, tert-butyl, pentyl, heptyl, 1-ethylpentyl, benzyl, 2-ethoxyethyl or 1-carboxymethyl), an alkenyl group (preferably an alkenyl group having from 2 to 20 carbon atoms, for example, vinyl, allyl or oleyl), an alkynyl group (preferably an alkynyl group having from 2 to 20 carbon atoms, for example, ethynyl, butadiynyl or phenylethynyl), a cycloalkyl group (preferably a cycloalkyl group having from 3 to 20 carbon atoms, for example, cyclopropyl, cyclopentyl, cyclohexyl or 4-methylcyclohexyl), an aryl group (preferably an aryl group having from 6 to 26 carbon atoms, for example, phenyl, 1-naphthyl, 4-methoxyphenyl, 2-chlorophenyl or 3-methylphenyl), a heterocyclic group (preferably a heterocyclic group having from 0 to 20 carbon atoms, in which the ring-constituting hetero atom is preferably an oxygen atom, a nitrogen atom or a sulfur atom, the ring may be condensed with a 5-membered or 6-membered ring, for example, a benzene ring or a hetero ring, and the ring may be a saturated ring, an unsaturated ring or an aromatic ring, for example, 2-pyridyl, 4-pyridyl, 2-imidazolyl, 2-benzimidazolyl, 2-thiazolyl or 2-oxazolyl), an alkoxy group (preferably an alkoxy group having from 1 to 20 carbon atoms, for example, methoxy, ethoxy, isopropyloxy or benzyloxy), an aryloxy group (preferably an aryloxy group having from 6 to 26 carbon atoms, for example, phenoxy, 1-naphthyloxy, 3-methylphenoxy or 4-methoxyphenoxy), an alkylthio group (preferably an alkylthio group having from 1 to 20 carbon atoms, for example, methylthio, ethylthio, isopropylthio or benzylthio), an arylthio group (preferably an arylthio having from 6 to 26 carbon atoms, for example, phenylthio, 1-naphthylthio, 3-methylphenylthio or 4-methoxyphenylthio), an acyl group (including an alkylcarbonyl group, an alkenylcarbonyl group, an arylcarbonyl group and a heterocyclic carbonyl group, preferably an acyl group having 20 carbon atoms or less, for example, acetyl, pivaloyl, acryloyl, methacryloyl, benzoyl or nicotinoyl), an aryloylalkyl group, an alkoxycarbonyl group (preferably an alkoxycarbonyl group having from 2 to 20 carbon atoms, for example, ethoxycarbonyl or 2-ethylhexyloxycarbonyl), an aryloxycarbonyl group (preferably an aryloxycarbonyl group having from 7 to 20 carbon atoms, for example, phenyloxycarbonyl or naphthyloxycarbonyl), an amino group (including an amino group, an alkylamino group, an arylamino group and a heterocyclic amino group, preferably an amino group having from 0 to 20 carbon atoms, for example, amino, N,N-dimethylamino, N,N-diethylamino, N-ethylamino, anilino, 1-pyrrolidinyl, piperidino or morpholinyl), a sulfonamide group (preferably a sulfonamide group having from 0 to 20 carbon atoms, for example, N,N-dimethylsulfonamide or N-phenylsulfonamide), a sulfamoyl group (preferably a sulfamoyl group having from 0 to 20 carbon atoms, for example, N,N-dimethylsulfamoyl or N-phenylsulfamoyl), an acyloxy group (preferably an acyloxy group having from 1 to 20 carbon atoms, for example, acetyloxy or benzoyloxy), a carbamoyl group (preferably a carbamoyl group having from 1 to 20 carbon atoms, for example, N,N-dimethylcarbamoyl or N-phenylcarbamoyl), an acylamino group (preferably an acylamino group having from 1 to 20 carbon atoms, for example, acetylamino, acryloylamino, benzoylamino or nicotinamide), a cyano group, a hydroxy group, a mercapto group and a halogen atom (for example, a fluorine atom, a chlorine atom, a bromine atom or an iodine atom).

The substituent which the group represented by any one of $R^{11}$, $R^{13}$ and $R^{15}$ may have may further have the substituent described above.

Of the substituents which the group represented by any one of $R^{11}$, $R^{13}$ and $R^{15}$ may have, an alkyl group, an aryl group and an acyl group are preferred.

Of the compounds represented by formula (I), preferred compounds are recited below.

<Compound in which any One of $R_{11}$, $R^{13}$ and $R^{15}$ is an Aralkyl Group>

The aralkyl group denotes a group in which an alkyl group is substituted with an aryl group. Of the aralkyl groups, an aralkyl group in which an alkyl group is substituted with one or two aryl groups (in case of being substituted with two aryl groups, it is preferred that they are substituted on the same carbon atom) is preferred. Further, an aralkyl group in which an alkyl group is substituted with an aryl group and an acyl group (preferably an aryloyl group) is also preferred.

<Compound in which any One of $R^{11}$, $R^{13}$ and $R^{15}$ is a Group Containing a Cycloalkyl Group, and Preferably the Group Containing a Cycloalkyl Group is a Cycloalkyl Group>

The ring structure in "a total of 3 or more ring structures are present in $R^{11}$, $R^{13}$ and $R^{15}$" includes a configuration where the substituent which the group represented by any one of $R^{11}$, $R^{13}$ and $R^{15}$ may have has a ring structure as well as a case where a basic structure of the group represented by any one of $R^{11}$, $R^{13}$ and $R^{15}$ per se has a ring structure.

The ring structure is preferably a cyclic saturated hydrocarbon structure or an aromatic cyclic structure (aromatic hydrocarbon structure or aromatic heterocyclic structure). Also, it may be a condensed ring structure.

In the case where the ring structure is the cyclic saturated hydrocarbon structure, it is preferred that the cyclic saturated hydrocarbon structure is present as a cycloalkyl group having from 3 to 20 carbon atoms. More specifically, it is more preferred to be present as a cyclopropyl group, a cyclopentyl group or a cyclohexyl group, and it is particularly preferred to be present as a cyclohexyl group.

In the case where the ring structure is the aromatic cyclic structure, it is preferably the aromatic hydrocarbon structure. It is preferred that the aromatic hydrocarbon structure is present as an aryl group having from 6 to 20 carbon atoms. More specifically, it is more preferred to be present as a phenyl group or a naphthyl group, and it is particularly preferred to be present as a phenyl group.

The compound represented by formula (I) is more preferably a compound in which $R^{11}$, $R^{13}$ and $R^{15}$ are an alkyl group having from 1 to 20 carbon atoms, an alkenyl group having from 2 to 20 carbon atoms or an aryl group having from 6 to 20 carbon atoms from the standpoint of the dissolution stability in the film formation. Further, it is more preferred that each of $R^{11}$, $R^{13}$ and $R^{15}$ has one or more ring structures, and it is still more preferred that each has one ring structure.

The compound represented by formula (I) is more preferably represented by formula (I-a) shown below.

Formula (I-a)

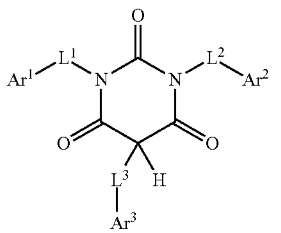

In formula (I-a), $L^1$ to $L^3$ each independently represents a single bond or a divalent connecting group having one or more carbon atoms, and $Ar^1$ to $Ar^3$ each independently represents an aryl group having from 6 to 20 carbon atoms.

In formula (I-a), $L^1$ to $L^3$ each independently represents a single bond or a divalent connecting group having one or more carbon atoms. $L^1$ to $L^3$ each preferably represents a single bond or an alkylene group having from 1 to 6 carbon atoms, more preferably a single bond, a methylene group or an ethylene group, and particularly preferably a single bond or a methylene group. Taking the dissolution stability into consideration, at least one of $L^1$ to $L^3$ is an alkylene group having from 1 to 6 carbon atoms. The divalent connecting group may have a substituent and the substituent is same as the substituent which the group represented by any one of $R^{11}$, $R^{13}$ and $R^{15}$ may have.

In formula (I-a), $Ar^1$ to $Ar^3$ each independently represents an aryl group having from 6 to 20, preferably a phenyl group or a naphthyl group, and more preferably a phenyl group. The group represented by any one of $Ar^1$ to $Ar^3$ may have a substituent, and the substituent is same as the substituent which the group represented by any one of $R^{11}$, $R^{13}$ and $R^{15}$ may have. It is preferred that $Ar^1$ to $Ar^3$ do not have a substituent, or in case of having a substituent, the substituent does not have a ring structure.

The molecular weight of the compound represented by formula (I) or formula (I-a) is preferably from 250 to 1,200, more preferably from 300 to 800, and particularly preferably from 350 to 600. It is preferred that the molecular weight is 250 or more because the compound is hardly volatilized from the film. It is preferred that the molecular weight is 1,200 or less because the haze is reduced.

Specific examples of the compound represented by formula (I) or (I-a) are set forth below, but the invention should not be construed as being limited thereto. In the compounds set forth below, Me represents a methyl group.

A-1

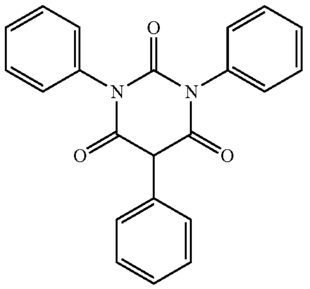

A-2

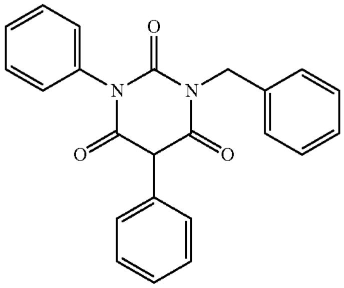

A-3

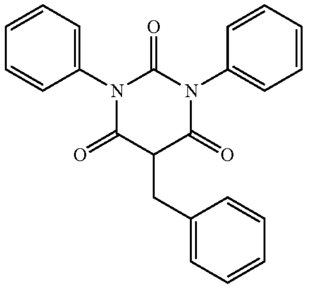

A-4

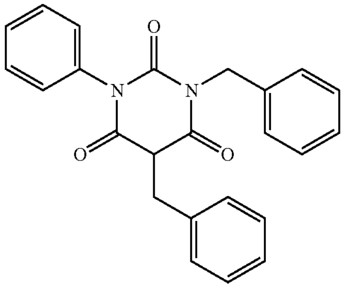

-continued

A-5

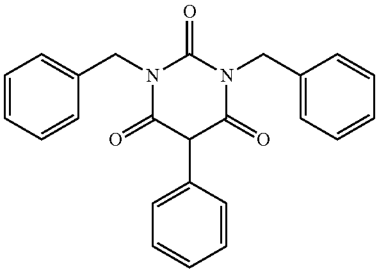

A-6

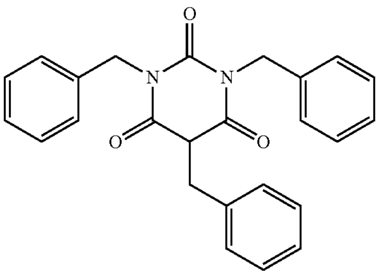

A-7

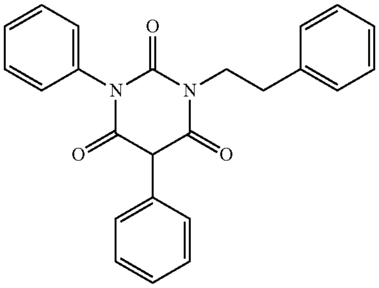

A-8

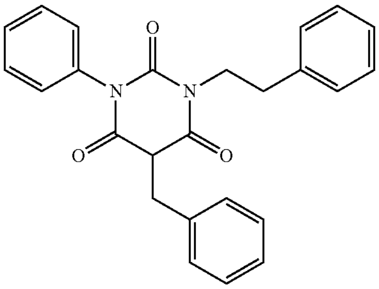

A-9

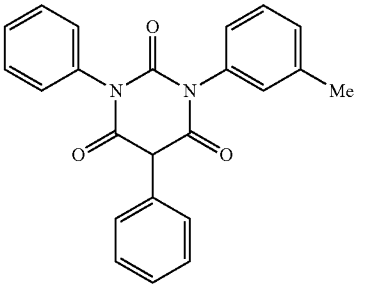

-continued
A-10
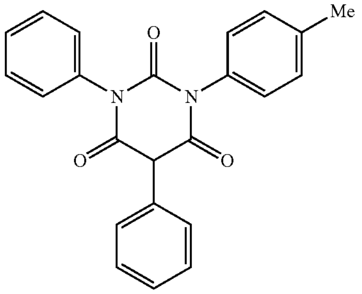
A-11
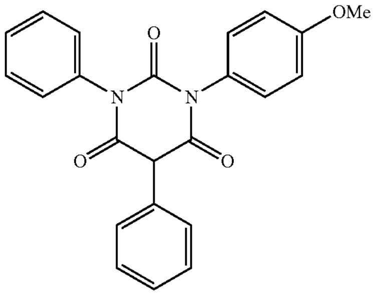
A-12
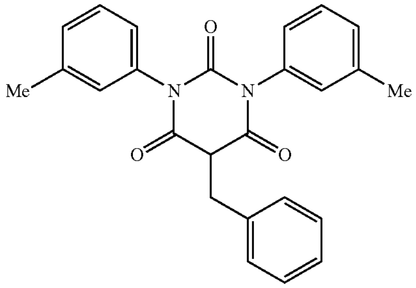
A-13
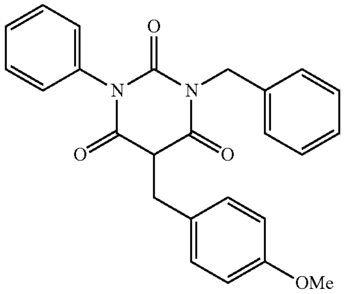
A-14
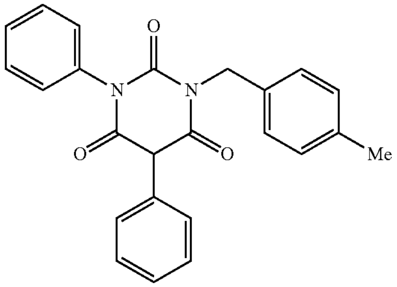
-continued
A-15
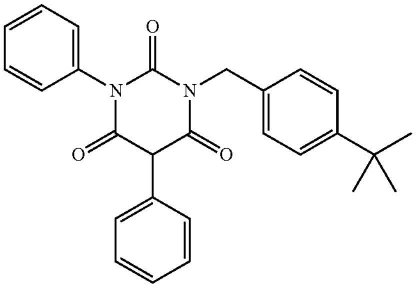
A-16
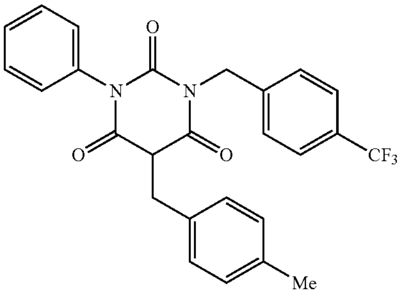
A-17
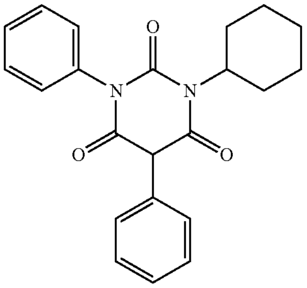
A-18
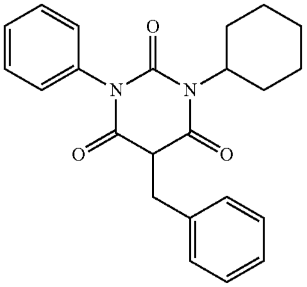
A-19
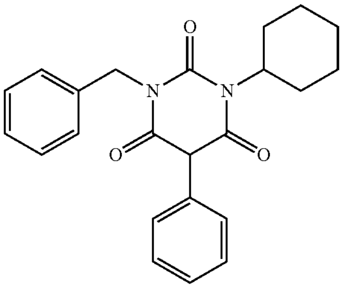

-continued
A-20
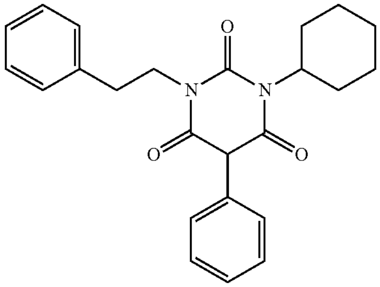
A-21
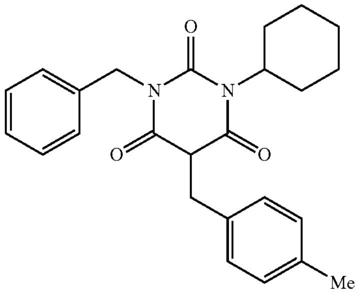
A-22
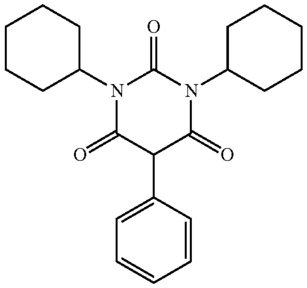
A-23
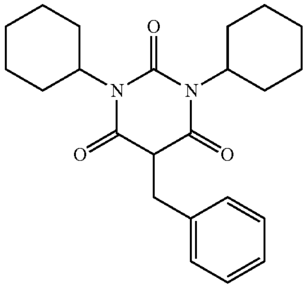
A-24
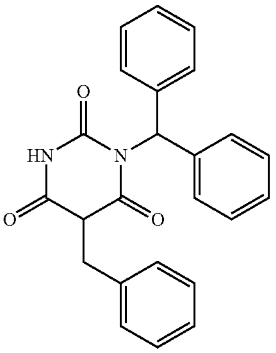
-continued
A-25
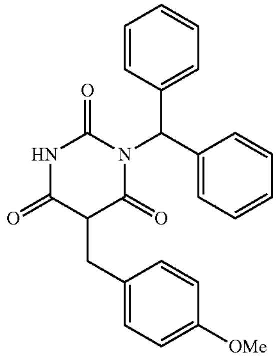
A-26
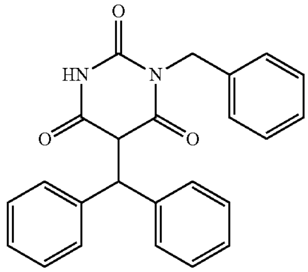
A-27
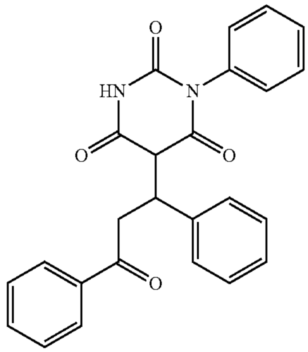
A-28
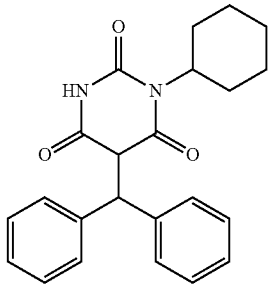
A-29
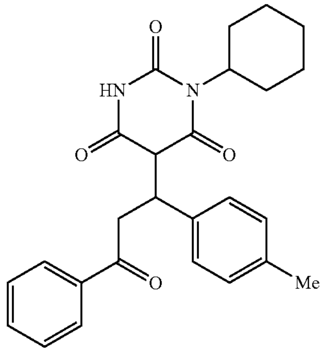

-continued

A-30

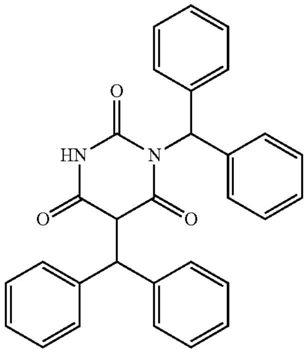

A-31

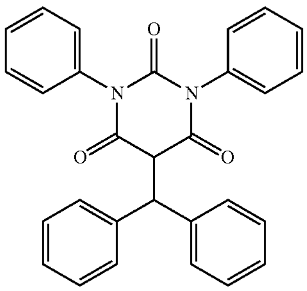

A-32

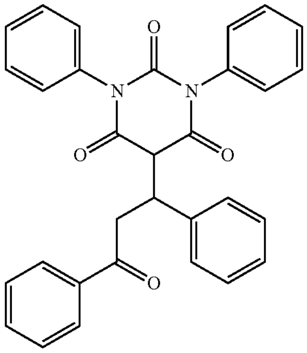

It is known that the compound represented by formula (I) can be synthesized using a synthesis method of barbituric acid in which a urea derivative and a malonic acid derivative are condensed. Barbituric acid which has two substituents on N is obtained by heating N,N'-disubstituted urea and malonic chloride, or heating malonic acid in combination with an activator, for example, acetic anhydride. For instance, methods described, for example, in *Journal of the American Chemical Society*, Vol. 61, page 1015 (1939), *Journal of Medicinal Chemistry*, Vol. 54, page 2409 (2011), *Tetrahedron Letters*, Vol. 40, page 8029 (1999) and WO 2007/150011 may be preferably used.

Further, the malonic acid used in the condensation may be unsubstituted or substituted. By using malonic acid having a substituent corresponding to the group represented by $R'^5$, barbituric acid is constituted to synthesis the compound represented by formula (I). Further, when unsubstituted malonic acid and a urea derivative are condensed, barbituric acid which is unsubstituted at the 5-position is obtained, and the barbituric acid is modified to synthesis the compound represented by Formula (I).

The synthesis method of the compound represented by formula (I) should not be construed as being limited to those described above.

The content of the compound represented by formula (I) in the protective film for polarizing plate is not particularly restricted, and is preferably from 0.1 to 20 parts by weight, more preferably from 0.2 to 15 parts by weight, particularly preferably from 0.3 to 10 parts by weight, relative to 100 parts by weight of the resin in the protective film for polarizing plate.

It is preferred that the content is 0.1 part by weight or more because the water vapor transmission rate can be effectively decreased. It is preferred that the content is 20 parts by weight or less because the haze can be reduced.

In the protective film for polarizing plate according to the invention, a compound represented by formula (II) shown below is preferably used as a hardness increasing agent. In particular, in the case where the resin constituting the protective film for polarizing plate is a cellulose acylate, a compound represented by formula (II) shown below is preferably used as a hardness increasing agent.

Formula (II)

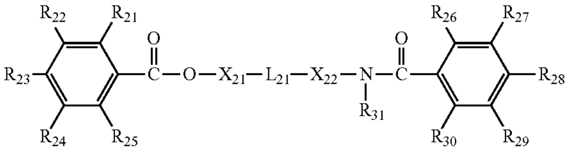

In formula (II), $R_{21}$ to $R_{27}$ and $R_{29}$ to $R_{31}$ each independently represents a hydrogen atom or a substituent, $R_{28}$ represents a hydrogen atom or a non-conjugated substituent, $X_{21}$ and $X_{22}$ each independently represents a single bond or an aliphatic connecting group, $L_{21}$ represents a single bond, $—N(R_{32})—$ or $—C(R_{33})(R_{34})—$, and $R_{32}$ to $R_{34}$ each independently represents a hydrogen atom or a substituent.

$R_{21}$ to $R_{27}$ and $R_{29}$ to $R_{30}$ each independently represents a hydrogen atom or a substituent, preferably a hydrogen atom or a non-conjugated substituent, more preferably a hydrogen atom, a halogen atom, an alkyl group or an alkoxy group, still more preferably a hydrogen atom, a fluorine atom, a chlorine atom, an alkyl group substituted with a fluorine atom and/or a chlorine atom, an unsubstituted alkyl group or an alkoxy group, yet still more preferably a hydrogen atom, a fluorine atom, a chlorine atom, an alkyl group having from 1 to 3 carbon atoms substituted with a fluorine atom and/or a chlorine atom, an unsubstituted alkyl group having from 1 to 5 carbon atoms or an alkoxy group having from 1 to 3 carbon atoms, and particularly preferably a hydrogen atom, a methyl group, an ethyl group, a methoxy group or an ethoxy group.

$R_{28}$ represents a hydrogen atom or a non-conjugated substituent. The non-conjugated substituent used in the invention denotes a substituent which does not have a conjugating group. Examples of the conjugating group include a carbonyl group, an imino group, a vinyl group, a cyano group, a nitro group and an aromatic group. $R_{28}$ is preferably a hydrogen atom, a halogen atom, an alkyl group or an alkoxy group, more preferably a hydrogen atom, a fluorine atom, a chlorine atom, an alkyl group substituted with a fluorine atom and/or a chlorine atom, an unsubstituted alkyl group or an alkoxy group, still more preferably a hydrogen atom, a fluorine atom, a chlorine atom, an alkyl group having from 1 to 3 carbon atoms substituted with a fluorine atom and/or a chlorine atom, an unsubstituted alkyl group having from 1 to 5 carbon atoms or an alkoxy group having from 1 to 3 carbon atoms, and particularly preferably a hydrogen atom, a methyl group, an ethyl group, a methoxy group or an ethoxy group.

$R_{31}$ represents a hydrogen atom or a substituent, and preferably a hydrogen atom or a non-conjugated substituent. $R_{31}$ is more preferably a hydrogen atom, an alcohol group or an alkyl group, still more preferably a hydrogen atom, a primary alcohol group having from 1 to 3 carbon atoms or an alkyl group having from 1 to 5 carbon atoms, and particularly preferably a hydrogen atom.

$X^1$ and $X^2$ each independently represents a single bond or an aliphatic connecting group.

The aliphatic connecting group denotes a non-aromatic group essentially containing a carbon atom. Specifically, examples thereof include an aliphatic hydrocarbon group (for example, an alkylene group, an alkynylene group or an alkenylene group) or a group obtained by combining an aliphatic hydrocarbon group and other group. Examples thereof include an aliphatic hydrocarbon group, a group obtained by combining an aliphatic hydrocarbon group and at least one of —O—, —C(═O)— and —S—. An alkylene group or a group obtained by combining an alkylene group and —O— is more preferred, an alkylene group is still more preferred, and an unsubstituted alkylene group is particularly preferred. The aliphatic linking group preferably has from 1 to 3 carbon atoms.

$L_{21}$ represents a single bond, —N($R_{32}$)— or —C($R_{33}$)($R_{34}$)—, and $R_{32}$ to $R_{34}$ each independently represents a hydrogen atom or a substituent.

$R_{32}$ represents a hydrogen atom or a substituent, and preferably a hydrogen atom or a non-conjugated substituent. $R_{32}$ is more preferably a hydrogen atom, an alcohol group, an alkyl group or a group represented by formula (V) shown below, still more preferably a hydrogen atom, a primary alcohol group having from 1 to 3 carbon atoms, an alkyl group having from 1 to 5 carbon atoms or a group represented by formula (V) shown below, yet still more preferably a hydrogen atom or a group represented by formula (V) shown below, and particularly preferably a group represented formula (V) shown below.

$R_{33}$ and $R_{34}$ each independently represents a hydrogen atom or a substituent, and preferably a hydrogen atom or a non-conjugated substituent.

$R_{33}$ or $R_{34}$ is more preferably a hydrogen atom, an alcohol group, an alkyl group, a hydroxy group, a group represented by formula (III) shown below or a group represented by formula (IV) shown below, and still more preferably a hydrogen atom, a primary alcohol group having from 1 to 3 carbon atoms, an alkyl group having from 1 to 5 carbon atoms, a hydroxy group, a group represented by formula (III) shown below or a group represented by formula (IV) shown below.

Formula (III)

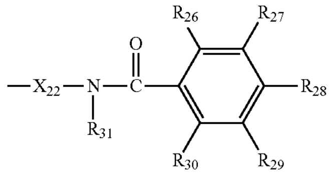

In formula (III), $R_{26}$, $R_{27}$ and $R_{29}$ to $R_{31}$ each independently represents a hydrogen atom or a substituent, $R_{28}$ represents a hydrogen atom or a non-conjugated substituent, and $X_{22}$ represents a single bond or an aliphatic connecting group.

Formula (IV)

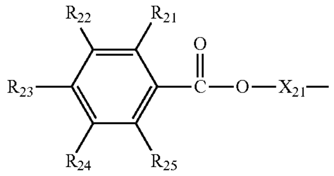

In formula (IV), $R_{21}$ to $R_{25}$ each independently represents a hydrogen atom or a substituent, and $X_{21}$ represents a single bond or an aliphatic connecting group.

Formula (V)

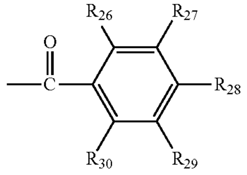

In formula (V), $R_{26}$, $R_{27}$, $R_{29}$ and $R_{30}$ each independently represents a hydrogen atom or a substituent, and $X_{28}$ represents a hydrogen atom or a non-conjugated substituent.

$R_{26}$ to $R_{31}$ and $X_{22}$ in formula (III) have the same meanings as $R_{26}$ to $R_{31}$ and $X_{22}$ defined in formula (II) respectively, and the preferred ranges are also the same.

$R_{21}$ to $R_{25}$ and $X_{21}$ in formula (IV) have the same meanings as $R_{21}$ to $R_{25}$ and $X_{21}$ defined in formula (II) respectively, and the preferred ranges are also the same.

$R_{26}$ to $R_{30}$ in formula (V) have the same meanings as $R_{26}$ to $R_{30}$ defined in formula (II) respectively, and the preferred ranges are also the same.

The molecular weight of the compound represented by formula (II) is preferably from 250 to 600, and more preferably from 350 to 500.

Specific examples of the compound represented by formula (II) preferably used in the invention are set forth below, but the invention should not be construed as being limited thereto.

1

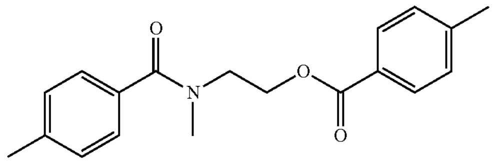

2

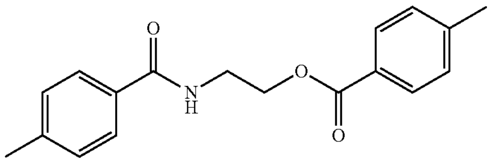

-continued
3
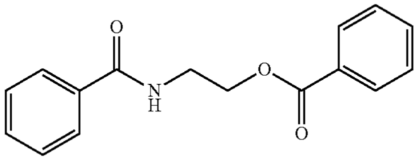
4
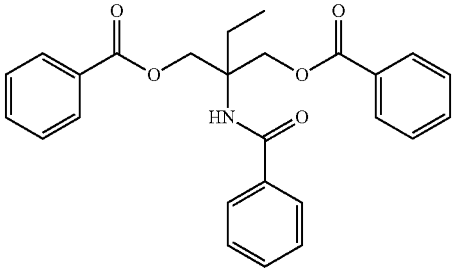
5
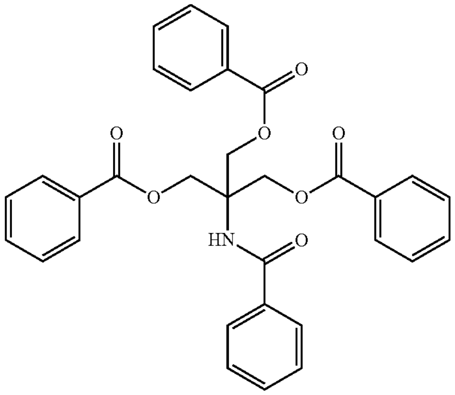
6
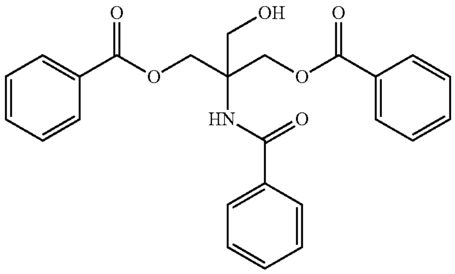
7
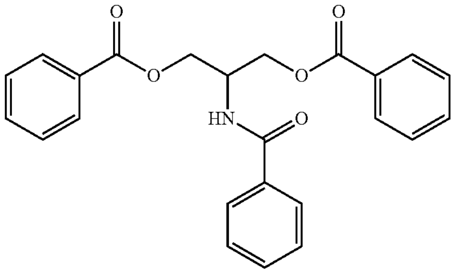
8
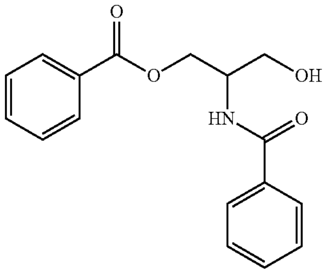
9
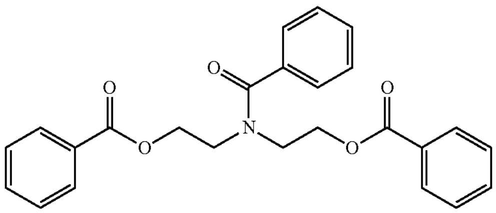
10
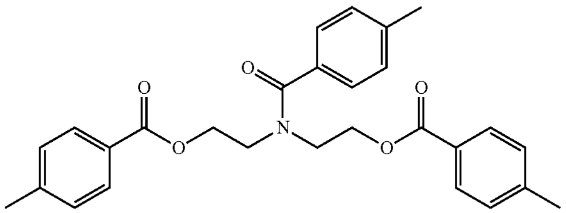
11
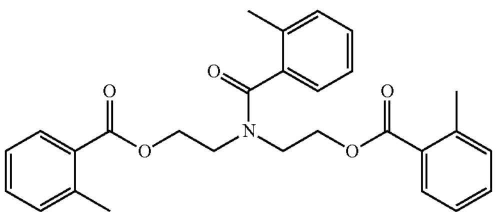
12
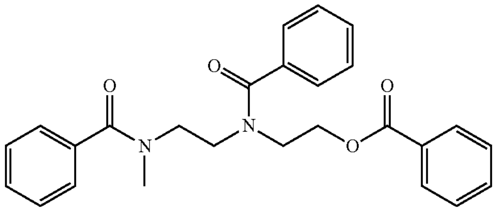
13
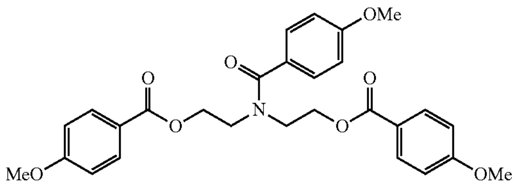
14
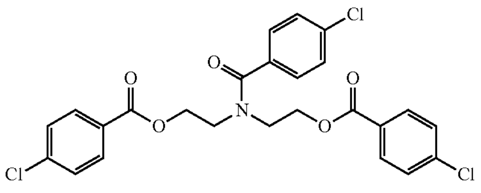

-continued
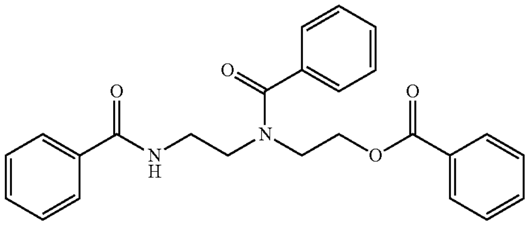
15
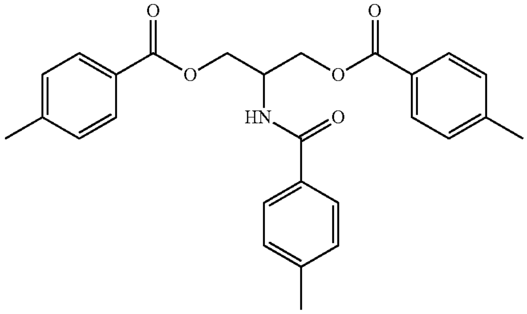
16
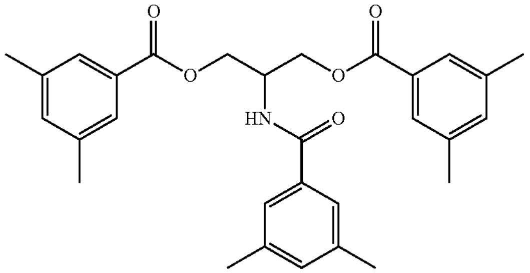
17
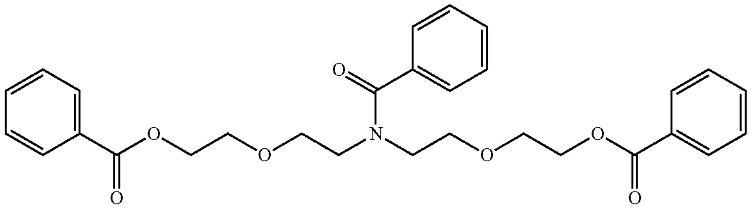
18
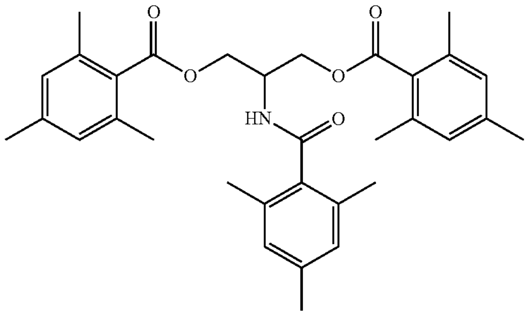
19
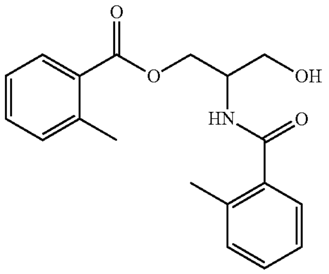
20
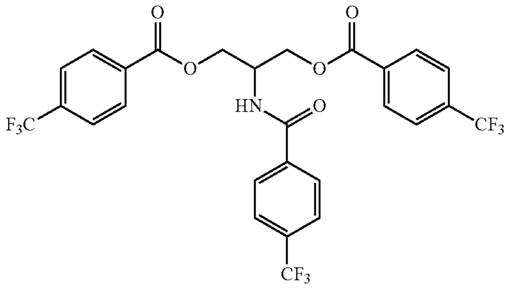
21
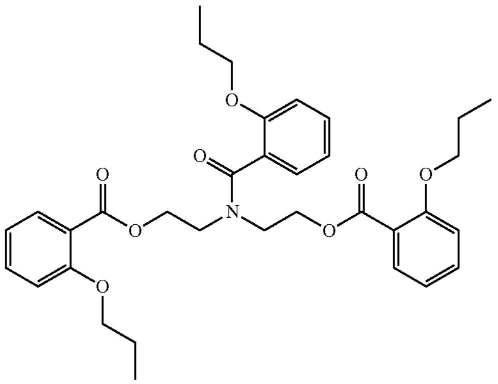
22

-continued
23
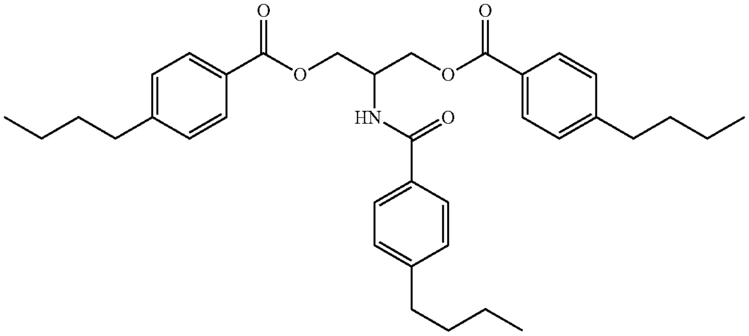
24
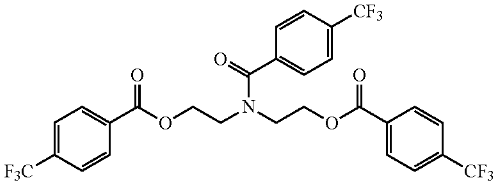
25
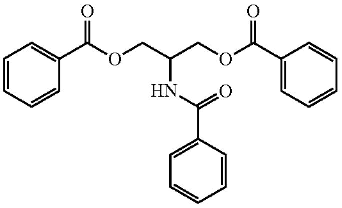
26
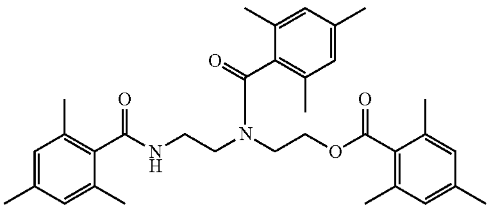
27
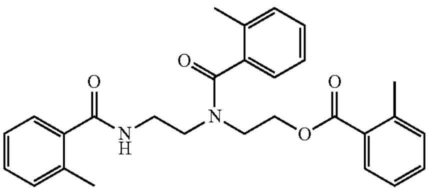
28
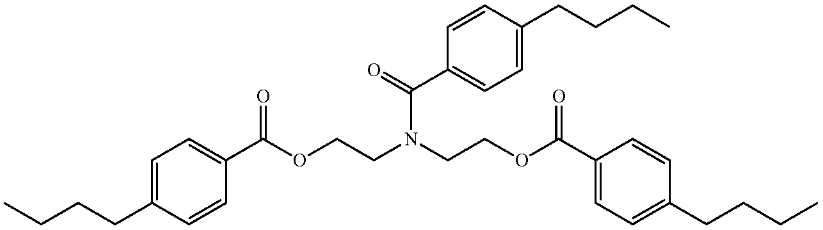
29
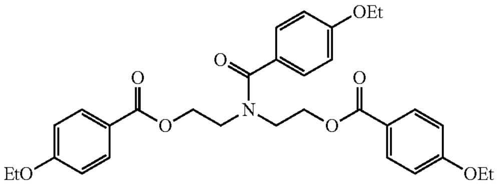
30
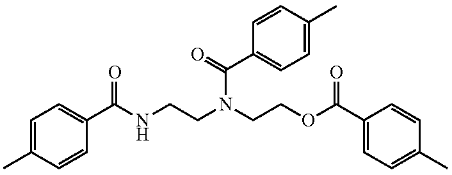
31
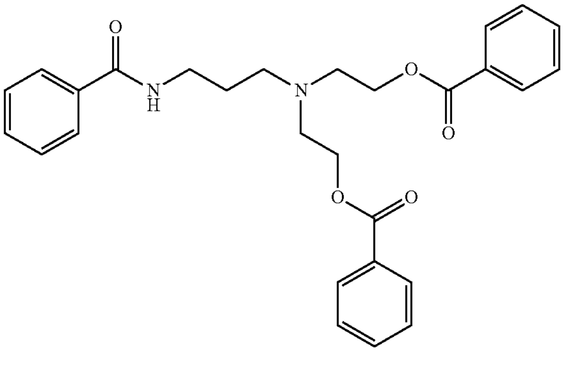

The content of the hardness increasing agent in the protective film for polarizing plate according to the invention is preferably from 2 to 20% by weight, more preferably from 5 to 15% by weight, reference to the resin constituting the protective film for polarizing plate.

In the protective film for polarizing plate according to the invention, two or more kinds of the hardness increasing agents may be contained from the standpoint of decrease in the haze of the film. In the case of using two or more kinds of the hardness increasing agents, it is preferred that the total content thereof is in the range described above.

<Production Method of Protective Film for Polarizing Plate>

The protective film for polarizing plate according to the invention can be produced by a solution casting film forming method. Although an embodiment using a cellulose acylate as the main component resin is explained for an example below as to the production method of the protective film for polarizing plate, the protective film for polarizing plate can be produced in the same manner by using other resins.

In the solution casting film forming method, the film is produced using a solution (dope) prepared by dissolving a cellulose acylate in an organic solvent.

The organic solvent preferably contains a solvent selected from an ether having from 3 to 12 carbon atoms, a ketone having from 3 to 12 carbon atoms, an ester having from 3 to 12 carbon atoms and a halogenated hydrocarbon having from 1 to 6 carbon atoms.

The ether, ketone and ester may have a cyclic structure. A compound having two or more functional groups of ether, ketone and eater (i.e., —O—, —CO— and —COO—) can also be used as the organic solvent. The organic solvent may have other functional group, for example, an alcoholic hydroxy group. In the case of the solvent having two or more functional groups, the number of the carbon atoms contained therein preferably falls within the preferred range of the number of carbon atoms described above for the solvent having any of the functional groups.

The amount of cellulose acylate in the cellulose acylate solution is preferably so adjusted that a solution prepared contains the cellulose acylate in an amount from 10 to 40% by weight. The amount of cellulose acylate is more preferably from 10 to 30% by weight. An optional additive described hereinafter may have been added to the organic solvent (main solvent).

The drying processes of the solution casting film forming method are described in U.S. Pat. Nos. 2,336,310, 2,367,603, 2,492,078, 2,492,977, 2,492,978, 2,607,704, 2,739,069 and 2,739,070, British Patents 640,731 and 736,892, JP-B-45-4554 (the term “JP-B” as used herein means an “examined Japanese patent publication”), JP-B-49-5614, JP-A-60-176834, JP-A-60-203430 and JP-A-62-115035. The drying on the band or drum may be conducted with blowing air or an inactive gas, for example, nitrogen.

Using the cellulose acylate solution (dope) prepared, two or more layers may be cast to form a film. In this case, preferably, the cellulose acylate film is formed according to the solution casting film forming method. It is preferred that the dope is cast on a drum or a band and that the solvent is evaporated to form a film. The dope before casting is preferably controlled at the concentration so as to have a solid content from 10 to 40%. The surface of the drum or band is preferably finished in a mirror state.

In the case of casting two or more layers of cellulose acylate solutions, plural cellulose acylate solutions may be cast. Specifically, the cellulose acylate solutions may be respectively cast through plural casting apertures disposed at intervals in the traveling direction of the support to stack on the support, thereby forming a film. For example, methods described in JP-A-61-158414, JP-A-1-122419 and JP-A-11-198285 can be employed. The cellulose acylate solution may be cast through two casting apertures to form a film. For example, methods described in JP-B-60-27562, JP-A-61-94724, JP-A-61-94725, JP-A-61-104813, JP-A-61-158413 and JP-A-6-134933 can be employed. Also a casting method for cellulose acylate film wherein a flow of a high viscosity cellulose acylate solution is enveloped with a low viscosity cellulose acylate solution and the resulting high viscosity and low viscosity cellulose acylate solutions are simultaneously extruded as described in JP-A-56-162617 may be employed.

Alternatively, a film may be formed by using two casting apertures wherein a film is formed on a support through a first casting aperture and then peeled, and a second casting is conducted on the side of film brought into contact with the support using a second casting aperture. For example, method described in JP-B-44-20235 is employed.

The cellulose acylate solution to be cast may be the same solution or two or more of different cellulose acylate solutions may be used. In order to make plural cellulose acylate layers have respective functions, cellulose acylate solutions corresponding to the desired functions may be cast through the respective casting apertures. Further, the cellulose acylate solution according to the invention may be cast simultaneously with a solution for other functional layer (for example, an adhesive layer, a dye layer, an antistatic layer, an antihalation layer, an ultraviolet absorbing layer or a polarizing layer).

(Addition of Ultraviolet Absorbing Agent)

The timing when the ultraviolet absorbing agent described above is added to the cellulose acylate solution which is an example of the resin material of the protective film for polarizing plate is not particularly restricted as far as it has been added at the time of film formation. For example, it may be added to the cellulose acylate solution at the time of synthesis of cellulose acylate or it may be mixed with cellulose acylate at the time of preparation of a dope.

(Addition of Hardness Increasing Agent)

The timing when the hardness increasing agent described above is added to the cellulose acylate solution which is an example of the resin material of the protective film for polarizing plate is not particularly restricted as far as it has been added at the time of film formation. For example, it may be added to the cellulose acylate solution at the time of synthesis of cellulose acylate or it may be mixed with cellulose acylate at the time of preparation of a dope.

(Addition of Other Additive)

A deterioration preventing agent (for example, an antioxidant, a peroxide decomposing agent, a radical inhibitor, a metal-inactivating agent, an acid scavenger or an amine) may be added to the protective film for polarizing plate. As to the deterioration preventing agent, there are descriptions in JP-A-3-199201, JP-A-5-197073, JP-A-5-194789, JP-A-5-271471 and JP-A-6-107854. The amount of the deterioration preventing agent added is preferably from 0.01 to 1% by weight, more preferably from 0.01 to 0.2% by weight of the solution (dope) prepared. It is preferred that the amount of the deterioration preventing agent added is 0.01% by weight or more because the effect of the deterioration preventing agent is sufficiently exerted and that the amount of deterioration preventing agent added is 1% by weight or less because bleed out (seepage) or the like of the deterioration preventing agent on the surface of the protective film hardly occurs. Particularly preferred examples of the deterioration preventing agent include butylated hydroxytoluene (BHT) and tribenzylamine (TBA).

It is also preferred to add a fine particle as a matting agent to the protective film for polarizing plate. Examples of the fine particle for use in the invention include silicon dioxide, titanium dioxide, aluminum oxide, zirconium oxide, calcium carbonate, talc, clay, calcined kaolin, calcined calcium silicate, calcium silicate hydrate, aluminum silicate, magnesium silicate and calcium phosphate. Of the fine particles, those containing silicon are preferred from the standpoint of low turbidity, and fine particle of silicon dioxide is particularly preferred. The fine particle of silicon dioxide preferably has an average primary particle size of 20 nm or less and an apparent specific gravity of 70 g/liter or more. The apparent specific gravity is more preferably from 90 to 200 g/liter, and still more preferably from 100 to 200 g/liter. The fine particle having a larger apparent specific gravity is more preferred because it makes possible to prepare a dispersion of high concentration to reduce haze and aggregates.

The processes from casting to post-drying may be performed under air atmosphere or under inactive gas atmosphere, for example, nitrogen gas. The winding machine for use in the production of the protective film for polarizing plate according to the invention may be any winding machine ordinarily employed. The film may be wound according to a winding method, for example, a constant tension method, a constant torque method, a tapered tension method, a programmed tension control method where the internal stress is kept constant.

(Stretching Treatment)

The protective film for polarizing plate may also be subjected to a stretching treatment. It is possible to impart the desired retardation to the protective film for polarizing plate by the stretching treatment. The stretching direction of cellulose acylate film is preferably any of the width direction and the longitudinal direction.

The method for stretching of the film in the width direction is described, for example, in JP-A-62-115035, JP-A-4-152125, JP-A-4-284211, JP-A-4-298310 and JP-A-11-48271.

The stretching of the film is conducted under heating conditions. The film may be stretched in a process for drying and this is effective for the film containing the remaining solvent. In the case of stretching in the longitudinal direction, for example, the film may be stretched by controlling a transporting roller speed in such a manner that the film winding speed is regulated faster than the film peeling speed. In the case of stretching in the width direction, the film may be stretched by transporting the film while holding both sides of the width direction by a tenter and gradually widening the distance between the tenters. Further, after drying, the film may be stretched by using a stretching machine (preferably, uniaxially stretched by using a long stretch machine).

(Saponification Treatment)

The protective film for polarizing plate is subjected to an alkali saponification treatment to impart the adhesion property to a material, for example, polyvinyl alcohol of the polarizer and it is preferably used as the protective film for polarizing plate. As to the method for saponification, method described in Paragraph Nos. [0211] and [0212] of JP-A-2007-86748 can be used.

The alkali saponification treatment of the protective film for polarizing plate is preferably performed, for example, according to a cycle of immersing the film surface in an alkali solution, neutralizing it with an acid solution, washing it with water and drying it. The alkali solution includes a potassium hydroxide solution and a sodium hydroxide solution, in which the hydroxide ion concentration preferably falls within a range from 0.1 to 5.0 mol/liter, and more preferably within a range from 0.5 to 4.0 mol/liter. The alkali solution temperature is preferably in a range from room temperature to 90° C., and more preferably in a range from 40 to 70° C.

In place of the alkali saponification treatment, an easy adhesion process as described in JP-A-6-94915 or JP-A-6-118232 may be applied.

[Film Thickness of Film]

The film thickness of the protective film for polarizing plate according to the invention is from 5 to 40 μm, preferably from 10 to 35 μm, and more preferably from 10 to 20 μm.

The thin film is preferred because when it is installed in a liquid crystal display device, the display unevenness hardly occurs after the lapse of time under high temperature and high humidity conditions. On the other hand, when the film is too thin, it is difficult to stably transport the film during the film production process and the polarizing plate production process.

[Transmittance of Film]

In the protective film for polarizing plate according to the invention, the transmittance at a wavelength of 300 nm is 2% or less, and preferably 0.5% or less. To control the transmittance at a wavelength of 300 nm to 2% or less is preferred from the standpoint of inhibiting the deterioration in polarization performance due to light.

In the protective film for polarizing plate according to the invention, the transmittance at a wavelength of 380 nm is 4% or less, and preferably 2% or less. To control the transmittance at a wavelength of 380 nm to 4% or less is preferred from the standpoint of inhibiting the deterioration in polarization performance due to light.

The transmittance of the protective film for polarizing plate can be controlled by the kind and amount of the ultraviolet absorbing agent.

[Hardness of Film]

In the protective film for polarizing plate according to the invention, the surface hardness measured by using a Knoop indenter at an indentation load of 50 mN is 210 N/mm$^2$ or more. Preferably, a minimum value of Knoop hardness measured at the same indentation position by rotating a Knoop indenter at an indentation load of 50 mN in accordance with the method of JIS Z 2251 is 210 N/mm$^2$ or more. The surface hardness (Knoop hardness) is measured by a nanoindentation method. JIS Z 2251 is Japanese Industrial Standards, which is defined based on ISO 4545. For example, a minimum value of Knoop hardness values in 18 directions in total measured by rotating a Knoop indenter by 10° at the same indentation position is 210 N/mm$^2$ or more. The surface hardness of the protective film for polarizing plate is preferably 220 N/mm$^2$ or more, and more preferably 230 N/mm$^2$ or more.

The surface hardness of the protective film for polarizing plate can be controlled by the kind and amount of the additive, polymerization degree of the resin, dope solvent composition, stretching treatment of the film and the like.

[Haze of Film]

The haze of the protective film for polarizing plate according to the invention is preferably from 0.01 to 0.8%, and more preferably from 0.05 to 0.5%. It is preferred that the haze is 0.8% or less because the contrast of liquid crystal display device is high.

The measurement of the haze is conducted using a 40 mm×80 mm sample of the protective film for polarizing plate at 25° C. and 60% RH by a haze meter (HGM-2DP, produced by Suga Test Instruments Co., Ltd.) in accordance with JIS K 7136.

[Water Vapor Transmission Rate of Film]

It is preferred for the protective film for polarizing plate according to the invention to satisfy the relationship between the water vapor transmission rate and the film thickness shown below after 24 hours passage at 40° C. and relative humidity of 90%.

$$0.010 \leq \text{film thickness } (\mu m)/\text{water vapor transmission rate } (g/m^2) \leq 0.035$$

It is more preferred to satisfy the relationship shown below.

$$0.010 \leq \text{film thickness } (\mu m)/\text{water vapor transmission rate } (g/m^2) \leq 0.030$$

It is still more preferred to satisfy the relationship shown below.

$$0.010 \leq \text{film thickness } (\mu m)/\text{water vapor transmission rate } (g/m^2) \leq 0.025$$

The camber or distortion of a panel and display unevenness resulting therefrom due to environment humidity in the case of installing the polarizing plate in a liquid crystal display device is influenced by both the thickness and the water vapor transmission rate of the protective film for polarizing plate. It is preferred that the protective film for polarizing plate is thinner because the camber or distortion of a panel resulting from dimension change or curl of the protective film for polarizing plate is smaller. However, making the protective film for polarizing plate thin increases the water vapor transmission rate to cause a problem in that the camber or distortion resulting from dimension change of the polarizer increases. Thus, it is preferred that the value of film thickness (μm)/water vapor transmission rate ($g/m^2$) of the protective film for polarizing plate is 0.035 or less because the camber or distortion resulting from both the protective film for polarizing plate and the polarizer can be reduced. On the other hand, it is preferred that the value of film thickness (μm)/water vapor transmission rate ($g/m^2$) of the protective film for polarizing plate is 0.010 or more because vaporization of water in a drying process after the production of polarizing plate is accelerated to prevent the deterioration in polarization performance.

The value of water vapor transmission rate as used herein is a value obtained by measuring a weight (g) of water vapor which passes through a sample having an area of 1 $m^2$ for 24 hours in an atmosphere of temperature of 40° C. and relative humidity of 90% in accordance with the water vapor transmission rate test (dish method) of JIS Z 0208.

[Polarizing Plate]

The polarizing plate according to the invention includes a polarizer and at least one sheet of the protective film for polarizing plate according to the invention.

The polarizing plate according to the invention preferably has a polarizer and protective films for polarizing plate on the both surfaces of the polarizer, and includes the protective film for polarizing plate according to the invention on at least one surface of the polarizer. A known protective film for polarizing plate may be provided on the surface of the polarizer opposite to the surface on which the protective film for polarizing plate according to the invention is provided. The polarizing plate according to the invention also preferably has a polarizer and the protective films for polarizing plate according to the invention on the both surfaces of the polarizer.

<Performance of Polarizing Plate>

(Polarization Degree)

The polarization degree of the polarizer according to the invention is preferably 99.950 or more, more preferably 99.970 or more, and most preferably 99.990 or more.

(Change in Polarization Degree)

Also, the smaller the amount of change in polarization degree before and after the light fastness test of polarizing plate, the more preferable.

As to the polarizing plate according to the invention, the amount of change in polarization degree after irradiation by Super Xenon Weather Meter SX75 produced by Suga Test Instruments Co., Ltd. under the circumstances of 60° C. and 50% relative humidity for 400 hours is preferably 1.0% or less, and more preferably 0.30% or less.

The amount of change in polarization degree is calculated according to the formula shown below.

Amount of change in polarization degree=Polarization degree after the light fastness test−Polarization degree before the light fastness test It is preferred to satisfy the range of the amount of change in polarization degree described above because stability of the polarizing plate is ensured in the use for a long period of time.

In the invention, the polarization degree of the polarizing plate was calculated according to the formula shown below using cross transmittance and parallel transmittance at a wavelength of 700 nm measured by an automatic polarizing film measuring device (VAP-7070, produced by JASCO Corp.).

Polarization degree=(parallel transmittance−cross transmittance)/(parallel transmittance+cross transmittance)

Two samples (5 cm×5 cm each) are prepared in which the polarizing plate according to the invention is stuck on a glass through an adhesive. In this case, the polarizing plate is stuck on the glass in such a manner that the protective film for polarizing plate according to the invention faces to the side opposite to the glass (air interface side). In the cross transmittance measurement, the glass side of the sample is placed towards the light source to conduct the measurement. Two samples are measured separately and the average values thereof are taken as the cross transmittance and the parallel transmittance, respectively.

(Other Characteristics)

With respect to other preferred optical characteristics and the like of the polarizing plate according to the invention, there are described in Paragraph Nos. [0238] to [0255] of JP-A-2007-86748 and it is preferred to fulfil these characteristics.

<Shape and Constitution>

With respect to the shape of the polarizing plate according to the invention, the polarizing plate includes not only a film sheet cut to have a size which can be directly installed in a liquid crystal display device but also a long film continuously produced and rolled up into a roll (for example, an embodiment having a roll length of 2,500 m or more, or 3,900 m or more). For use in a large screen liquid crystal display device, a width of the polarizing plate is preferably 1,470 mm or more.

The polarizing plate according to the invention is constituted from a polarizer and at least one sheet of the protective film for polarizing plate according to the invention. The polarizing plate is also preferably constituted by sticking a protect film to one surface of the polarizing plate and a separate film to the other surface of the polarizing plate.

The protect film and separate film are used for the purpose of protecting the polarizing plate, for example, at the shipment of the polarizing plate or at the product inspection. In this case, the protect film is stuck for the purpose of protecting the surface of polarizing plate and used on the surface opposite the surface through which the polarizing plate is stuck to a liquid crystal plate. The separate film is used for the purpose of covering the adhesive layer which is stuck to a liquid crystal plate and used on the surface through which the polarizing plate is stuck to the liquid crystal plate.

The polarizer and two protective films for polarizing plate which can be used in the polarizing plate according to the invention are described in detail below.

<Polarizer>

The polarizer for use in the polarizing plate according to the invention is described below.

The polarizer which can be used in the polarizing plate according to the invention is preferably composed of polyvinyl alcohol (PVA) and a dichroic molecule. A polyvinylene polarizer prepared by dehydrating or dechlorinating PVA or polyvinyl chloride to form a polyene structure and orienting it as described in JP-A-11-248937 can also be used.

(Film Thickness of Polarizer)

The film thickness of the polarizer before stretching is not particularly restricted, and it is preferably from 1 μm to 1 mm, particularly preferably from 5 to 200 μm from the standpoints of stability of film retention and uniformity of stretching. Also, a thin PVA film in which a stress generated at the time of stretching in water by from 4 to 6 times becomes 10 N or less as described in JP-A-2002-236212 may be used.

<Production Method of Polarizer>

The method of producing the polarizer in the method of producing the polarizing plate according to the invention is not particularly restricted. For example, a film of PVA is formed and a dichroic molecule is introduced therein to constitute a polarizer. The production of PVA film can be conducted with reference to methods described, for example, in Paragraph Nos. [0213] to [0237] of JP-A-2007-86748, Japanese Patent No. 3342516, JP-A-9-328593, JP-A-2001-302817 and JP-A-2002-144401.

<Stacking Method of Polarizer and Protective Film for Polarizing Plate>

In the method for producing the polarizing plate according to the invention, at least one sheet of the protective film for polarizing plate according to the invention is stacked on only one surface of the polarizer obtained as described above.

In the method for producing the polarizing plate according to the invention, preferably, the protective film for polarizing plate is subjected to an alkali treatment and then stuck to both surfaces of the polarizer which is prepared by immersing a polyvinyl alcohol film in an iodine solution and stretching, using an aqueous solution of completely saponified polyvinyl alcohol, thereby producing the polarizing plate.

The adhesive used for sticking the treated surface of the protective film for polarizing plate to the polarizer includes, for example, a polyvinyl alcohol adhesive, e.g., polyvinyl alcohol or polyvinyl butyral and a vinyl latex, e.g., butyl acrylate.

For the sticking of the protective film for polarizing plate to the polarizer in the polarizing plate according to the invention, it is preferred to be stuck each other in such a manner that the transmission axis of the polarizer is substantially parallel to the slow axis of the protective film for polarizing plate.

The term "substantially parallel" as used herein means that a deviation between the direction of the main refractive index nx of the protective film for polarizing plate and the direction of the transmission axis of the polarizer is within 5°. The deviation is preferably within 1°, and more preferably within 0.5°. The deviation within 1° is preferred because the polarization degree performance under cross-Nicol position of the polarizer hardly decreases and light leakage hardly occurs.

<Functionalization of Polarizing Plate>

The polarizing plate according to the invention may be preferably used as a functionalized polarizing plate by combining with an antireflection film for increasing visibility of display, a luminance increasing film, or an optical film having a functional layer, for example, a hardcoat layer, a forward scattering layer or an antiglare layer (antidazzle layer). The antireflection film, luminance increasing film, other functional optical film, hardcoat layer, forward scattering layer and antiglare layer used for the functionalization are described in Paragraph Nos. [0257] to [0276] of JP-A-2007-86748, and according to the descriptions the functionalized polarizing plate can be produced.

[Liquid Crystal Display Device]

The liquid crystal display device according to the invention is described below.

The liquid crystal display device according to the invention comprises at least one sheet of the polarizing plate according to the invention.

FIG. 1 is a view schematically showing an example of the liquid crystal display device according to the invention. In FIG. 1, a liquid crystal display device 10 comprises a liquid crystal cell containing a liquid crystal layer 5 and a liquid crystal cell upper electrode substrate 3 and a liquid crystal cell lower electrode substrate 6 respectively provided thereabove and therebelow, and an upper polarizing plate 1 and a lower polarizing plate 8 provided on the both sides of the liquid crystal cell. A color filter may be provided between the liquid crystal cell and each of the polarizing plates. In the case where the liquid crystal display device 10 is employed as a transmission type device, it is equipped with a backlight using a light source, for example, a cold-cathode or hot-cathode fluorescent tube, a light emitting diode, a field emission device or an electroluminescent device on the back side.

Each of the upper polarizing plate 1 and the lower polarizing plate 8 has a stacked structure wherein the polarizer is sandwiched between two protective films for the polarizing plate. In the liquid crystal display device 10 according to the invention, at least one of the protective films is the protective film for polarizing plate according to the invention. The liquid crystal display device 10 according to the invention is preferably stacked from the outside (side far from the liquid crystal cell) of the device in order of the protective film for polarizing plate according to the invention, the polarizer and an ordinary transparent protective film.

The liquid crystal display device 10 includes an image direct-view type, an image projection type and a light modulation type. The invention can be effectively applied to an active matrix liquid crystal display device using a 3-terminal or 2-terminal semiconductor element, for example, a TFT or an MIM. Needless to say, it is also effectively applicable to a passive matrix liquid crystal display device represented by an STN mode called time division driving.

An IPS mode liquid crystal display device described in Paragraph Nos. [0128] to [0136] of JP-A-2010-102296 is preferably used as the liquid crystal display device according to the invention.

EXAMPLES

The invention will be described in more detail with reference to the examples below. The materials, reagents, amounts, proportions, operations and the like described in the examples can be appropriately altered as long as the gist of the invention is not exceeded. Therefore, the scope of the invention should not be construed as being limited to the specific examples described below.

Example 101

Preparation of Cellulose Acylate Solution 101

The composition shown below was put into a mixing tank and stirred to dissolve the components, thereby preparing Cellulose acylate solution 101.

Composition of Cellulose Acylate Solution 101

| | |
|---|---|
| Cellulose acetate having acetyl substitution degree of 2.88, Mw of 330,000 and Mn of 15,000 | 100.0 parts by weight |
| Hardness increasing agent (7) | 5.0 parts by weight |
| Hardness increasing agent (15) | 5.0 parts by weight |
| Methylene chloride (first solvent) | 412.2 parts by weight |
| Ethanol (second solvent) | 35.8 parts by weight |

(Preparation of Matting Agent Solution 102)

The composition shown below was put into a disperser and stirred to dissolve the components, thereby preparing Matting agent solution 102.

Composition of Matting Agent Solution 102

| | |
|---|---|
| Silica particle having average particle size of 20 nm (AEROSIL R 972, produced by Nippon Aerosil Co., Ltd.) | 2.0 parts by weight |
| Methylene chloride (first solvent) | 79.9 parts by weight |
| Ethanol (second solvent) | 6.9 parts by weight |
| Cellulose acylate solution 101 | 0.9 parts by weight |

(Preparation of Ultraviolet Absorbing Agent Solution 103)

The composition shown below was put into a mixing tank and stirred with heating to dissolve the components, thereby preparing Ultraviolet absorbing agent solution 103.

Composition of Ultraviolet Absorbing Agent Solution 103

| | |
|---|---|
| Ultraviolet absorbing agent (S-12) | 6.5 parts by weight |
| Ultraviolet absorbing agent (A-01) | 13.5 parts by weight |
| Methylene chloride (first solvent) | 73.6 parts by weight |
| Ethanol (second solvent) | 6.4 parts by weight |

<Casting>

After filtering each of 1.3 parts by weight of Matting agent solution 102 and 2.6 parts by weight of Ultraviolet absorbing agent solution 103, they are mixed using an in-line mixer, further 96.1 parts by weight of Cellulose acylate solution 101 was added thereto, followed by mixing using an in-line mixer. Using a band casting apparatus, the dope prepared above was cast onto a stainless steel casting support (support temperature: 22° C.). The resulting film was peeled from the support in the state where the amount of remaining solvent in the dope was approximately 20% by weight, and then both ends in the width direction of the film were grasped with a tenter and the film was dried at temperature of 120° C. while stretching it 1.10 times (10%) in the width direction in the state where the amount of remaining solvent was from 5 to 10% by weight. Thereafter, the film was further dried by transporting it between rolls of a heat treatment apparatus, thereby preparing a cellulose acylate film (protective film for polarizing plate) for Example 101. The thickness and the width of the cellulose acylate film obtained were 30 μm and 1,480 mm, respectively.

Ultraviolet Absorbing Agent (S-12):

Absorption maximum wavelength: 368 nm

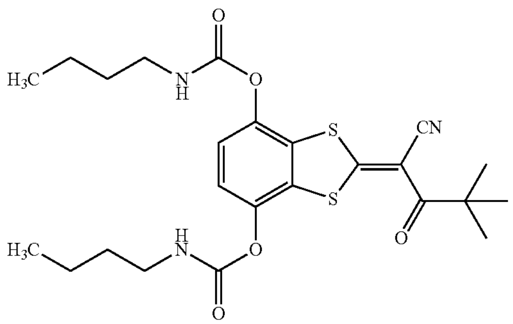 [SMILES: CCCCNC(=O)Oc1ccc(OC(=O)NCCCC)c2c1SC(=C(C#N)C(=O)C(C)(C)C)S2]

Ultraviolet Absorbing Agent (A-01):

Absorption maximum wavelength: 303 nm and 343 nm

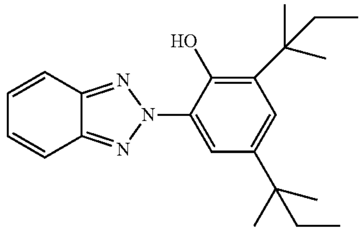 [SMILES: CCC(C)(C)c1cc(-n2nc3ccccc3n2)c(O)c(C(C)(C)CC)c1]

Hardness Increasing Agent (7):

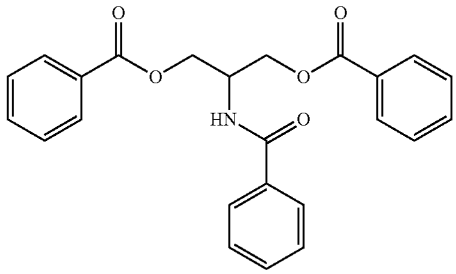 [SMILES: O=C(NC(COC(=O)c1ccccc1)COC(=O)c1ccccc1)c1ccccc1]

Hardness Increasing Agent (15):

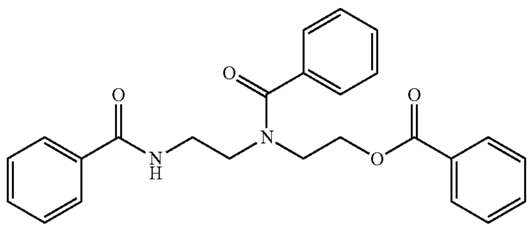 [SMILES: O=C(NCCN(CCOC(=O)c1ccccc1)C(=O)c1ccccc1)c1ccccc1]

Examples 102 to 113 and Comparative Examples 201 to 208

The protective films for polarizing plate for Examples 102 to 113 and Comparative Examples 201 to 208 were produced in the same manner as in the production of the protective film for polarizing plate for Example 101 except for changing the kind and amount of the ultraviolet absorbing agent, the kind and amount of the hardness increasing agent and the thickness of the film to those shown in Table 1 below, respectively.

Ultraviolet Absorbing Agent (S-01):

Absorption maximum wavelength: 367 nm

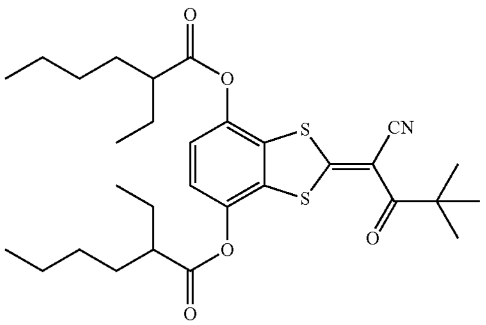 [SMILES: CCCCC(CC)C(=O)Oc1ccc(OC(=O)C(CC)CCCC)c2c1SC(=C(C#N)C(=O)C(C)(C)C)S2]

Ultraviolet Absorbing Agent (11):

Absorption maximum wavelength: 385 nm

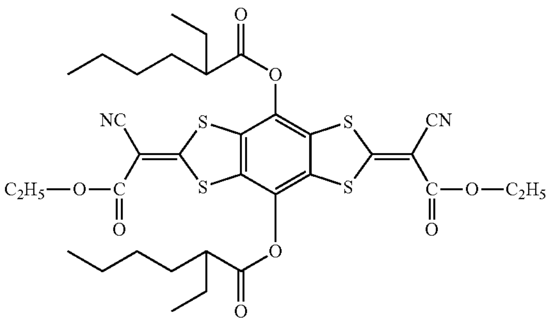 [SMILES: CCCCC(CC)C(=O)Oc1c2c(c(OC(=O)C(CC)CCCC)c3c1SC(=C(C#N)C(=O)OCC)S3)SC(=C(C#N)C(=O)OCC)S2]

Ultraviolet Absorbing Agent (UV-9):

Absorption maximum wavelength: 303 nm and 343 nm

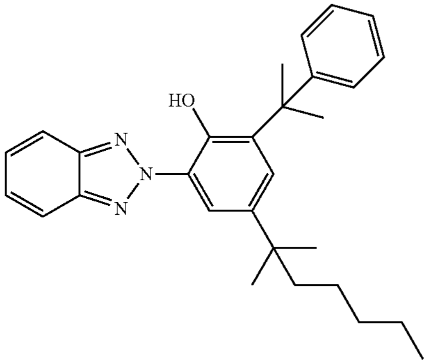 [SMILES: CCCCCC(C)(C)c1cc(-n2nc3ccccc3n2)c(O)c(C(C)(C)c2ccccc2)c1]

Ultraviolet Absorbing Agent (B-1):

Absorption maximum wavelength: 275 nm

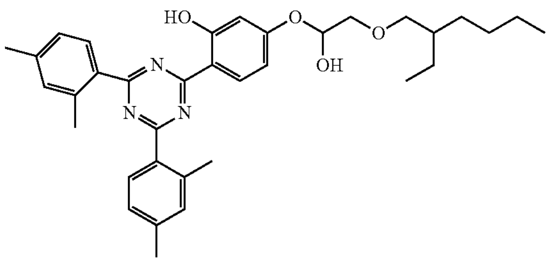 [SMILES: CCCCC(CC)COCC(O)Oc1ccc(-c2nc(-c3ccc(C)cc3C)nc(-c3ccc(C)cc3C)n2)c(O)c1]

Ultraviolet Absorbing Agent (C-1):

Absorption maximum wavelength: 328 nm

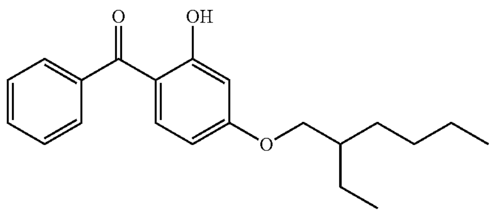 [SMILES: CCCCC(CC)COc1ccc(C(=O)c2ccccc2)c(O)c1]

Ultraviolet Absorbing Agent (C-2):

Absorption maximum wavelength: 328 nm

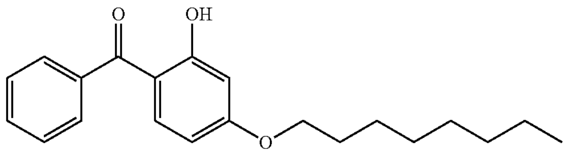 [SMILES: CCCCCCCCOc1ccc(C(=O)c2ccccc2)c(O)c1]

Ultraviolet Absorbing Agent (S-32):

Absorption maximum wavelength: 367 nm

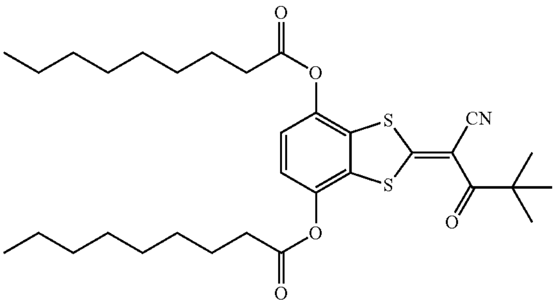 [SMILES: CCCCCCCCC(=O)Oc1ccc(OC(=O)CCCCCCCC)c2c1SC(=C(C#N)C(=O)C(C)(C)C)S2]

Ultraviolet Absorbing Agent (A-02):

Absorption maximum wavelength: 343 nm

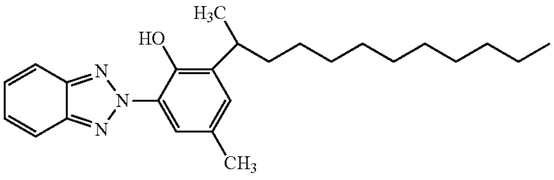 [SMILES: CCCCCCCCCCC(C)c1cc(C)cc(-n2nc3ccccc3n2)c1O]

Example 301

Preparation of Acrylic Solution 301

The composition shown below was put into a mixing tank and stirred to dissolve the components, thereby preparing Acrylic solution 301.

Composition of Acrylic Solution 301

| | |
|---|---|
| DIANAL BR 88 produced by Mitsubishi Rayon Co., Ltd. | 100.0 parts by weight |
| Harness increasing agent (A-2) | 12.0 parts by weight |
| Ultraviolet absorbing agent (11) | 1.5 parts by weight |
| Ultraviolet absorbing agent (C-1) | 3.4 parts by weight |

-continued

| | |
|---|---|
| Methylene chloride (first solvent) | 393.0 parts by weight |
| Methanol (second solvent) | 59.0 parts by weight |

Harness increasing agent (A-2):

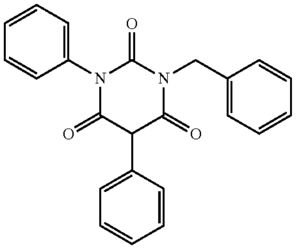 [SMILES: O=C1C(c2ccccc2)C(=O)N(c2ccccc2)C(=O)N1Cc1ccccc1]

(Preparation of Cellulose Acylate Solution 302)

The composition shown below was put into a mixing tank and stirred to dissolve the components, thereby preparing Cellulose acylate solution 302.

Composition of Cellulose Acylate Solution 302

| | |
|---|---|
| Cellulose acetate having acetyl substitution degree of 2.86 and polymerization degree of 350 | 100.0 parts by weight |
| Harness increasing agent (A-2) | 10.0 parts by weight |
| Ultraviolet absorbing agent (11) | 1.5 parts by weight |
| Ultraviolet absorbing agent (C-1) | 3.4 parts by weight |
| Methylene chloride (first solvent) | 414.0 parts by weight |
| Methanol (second solvent) | 62.0 parts by weight |

<Production of Stacked Film>

Acrylic solution 301 and Cellulose acylate solution 302 were cast on a metal support through a casting giesser capable of conducting 3 layer co-casting so as to form a constitution of acrylic layer/cellulose acylate layer/acrylic layer=30 μm/10 μm/30 μm on near side from the metal support. The dope was dried with drying wind at 40° C. while it was on the metal support to form a film, and the film was peeled from the metal support, both ends of the film were fixed with pins and the film was dried with drying wind at 105° C. for 5 minutes while maintaining the same distance between the pins. After removing the pins, the film was further dried at 130° C. for 20 minutes and rolled up in the state of a stacked film.

From the stacked film thus-produced were removed the upper and lower acrylic layers by peeling to produce a cellulose acylate film having a thickness of 10 μm.

Examples 302 to 305

The protective films for polarizing plate for Examples 302 to 305 were produced in the same manner as in the production of the protective film for polarizing plate for Example 301 except for changing the kind and amount of the ultraviolet absorbing agent and the thickness of the film to those shown in Table 1 above, respectively.

<Evaluation of Transmittance and Coloration of Film>

Transmittance of one sheet of the protective film for polarizing plate was measured in a wavelength range from 200 to 700 nm by a spectrophotometer (UV-3150, produced by Shimadzu Corp.). Further, ten sheets of the protective films for polarizing plate were accumulated, and transmittance thereof was measured by 2 nm in a wavelength range from 400 to 780 nm and the b* value was determined by using accompanying Color Measurement Software COL-UVPC at an viewing angle of 2° and illuminant C.

<Measurement of Haze of Film>

The haze of film was measured using a sample (40 mm×80 mm) of the film at 25° C. and 60% RH by a haze meter (HGM-2DP, produced by Suga Test Instruments Co., Ltd.) in accordance with JIS K 7136.

<Measurement of Surface Hardness of Cellulose Acylate Film>

A surface of a sample fixed on a glass substrate was measured using a hardness tester (FISCHERSCOPE H100VP, produced by Fischer Instruments K.K.) under conditions including a loading time of 10 sec, a creep time of 5 sec, an unloading time of 10 sec and a maximum load of 50 mN by a Knoop indenter in which the minor axis direction of the Knoop indenter was disposed in parallel to the transporting direction (longitudinal direction: test direction in the pencil hardness test) in the film formation of cellulose acylate film. The hardness was calculated from the relationship between the maximum load and the contact area between the indenter and the sample obtained from the indentation depth, and an average value of these five points were defined as the surface hardness.

Also, a surface of the sample fixed on a glass substrate was measured in accordance with the method of JIS Z 2251 using a hardness tester (FISCHERSCOPE H100VP, produced by Fischer Instruments K.K.) under conditions including a loading time of 10 sec, a creep time of 5 sec, an unloading time of 10 sec and a maximum load of 50 mN, and the hardness was calculated from the relationship between the maximum load and the contact area between the indenter and the sample obtained from the indentation depth. JIS Z 2251 is Japanese Industrial Standards, which is defined based on ISO 4545.

Further, measurements of Knoop hardness were conducted in 18 directions in total by rotating the Knoop indenter by 10° at the same indentation position, and the minimum value of Knoop hardness was obtained. The minimum value corresponded to the surface hardness obtained in the measurement in which the minor axis direction of the Knoop indenter was disposed in parallel to the transporting direction (longitudinal direction: test direction in the pencil hardness test) in the film formation of cellulose acylate film <Measurement of Water Vapor Transmission Rate>

A weight (g) of water vapor passing through a sample for 24 hours in an atmosphere of temperature of 40° C. and relative humidity of 90% in accordance with the water vapor transmission rate test (dish method) of JIS Z 0208, and the value of film thickness (μm)/water vapor transmission rate ($g/m^2$) was calculated.

<Production of Polarizer>

A polyvinyl alcohol (PVA) film having a thickness of 80 μm was immersed in an aqueous iodine solution having an iodine concentration of 0.05% by weight at 30° C. for 60 seconds to dye, stretched 5 times its original length while immersing in an aqueous boric acid solution having a boric acid concentration of 4% by weight for 60 seconds, and dried at 50° C. for 4 minutes, thereby producing a polarizer having a thickness of 19 μm.

<Saponification Treatment of Protective Film for Polarizing Plate>

Protective film for polarizing plate for Example 101 was immersed in an aqueous 2.3 mol/L sodium hydroxide solution at 55° C. for 3 minutes. The film was washed in a water washing bath tank at room temperature and neutralized at 30° C. using 0.05 mol/L of sulfuric acid. The film was again washed in a water washing bath tank at room temperature and dried by hot air of 100° C. Thus, the saponification treatment of the surface of the protective film for polarizing plate for Example 101 was performed.

[Production of Polarizing Plate]

The protective film for polarizing plate for Example 101 subjected to the saponification treatment was stuck on both surfaces of the polarizer using a polyvinyl alcohol adhesive. The polarizer and protective film for polarizing plate for Example 101 were stuck in such a manner that the transmitting axis of the polarizer was parallel to the width direction of the protective film for polarizing plate for Example 101. Thus, a polarizing plate for Example 101 was produced.

[Production of Polarizing Plates for Examples 102 to 113 and 301 to 305 and Comparative Examples 201 to 208]

The polarizing plates for the examples and comparative examples were produced in the same manner as in Example 101 except for changing the kind of protective film for polarizing plate used in Example 101 to those shown in Table 1, respectively.

(Evaluation of Light Fastness of Polarizing Plate)

As to each of the polarizing plates for the examples and comparative examples produced above, the parallel transmittance and cross transmittance of the polarizer at a wavelength of 700 nm were measured by the method described hereinbefore, and the polarization degree was calculated according to the formula shown below.

Polarization degree=(parallel transmittance−cross transmittance)/(parallel transmittance+cross transmittance)

Further, as to each of the polarizing plates after irradiation by Super Xenon Weather Meter SX75 produced by Suga Test Instruments Co., Ltd. under the circumstances of 60° C. and 50% relative humidity for 400 hours, the parallel transmittance and cross transmittance of the polarizer were measured and the polarization degree was calculated in the same manner as above.

The amount of change in polarization degree between before and after the irradiation was determined and evaluated according the criteria shown below to be described as the light fastness of polarizing plate in Table 1 below.

A: The amount of change in polarization degree at a wavelength of 700 nm was less than 0.3%.

B: The amount of change in polarization degree at a wavelength of 700 nm was from 0.3% to less than 1.0%.

C: The amount of change in polarization degree at a wavelength of 700 nm was 1.0% or more.

From the results shown in Table 1, it can be seen that the polarizing plates using the protective film for polarizing plate according to the invention are preferred in comparison with the polarizing plates of the comparative examples in view of a small amount of change in the polarization degree at a wavelength of 700 nm between before and after the xenon irradiation.

<Evaluation of Pencil Hardness>

The evaluation of pencil hardness was conducted to a sample obtained by coating an active energy ray-curable layer on the protective film for polarizing plate as described below.

(Film Formation of Active Energy Ray-Curable Layer)

<Preparation of Coating Solution (HC-1) for Hardcoat Layer>

The composition shown below was prepared, followed by filtrating with a polypropylene filter having a pore size of 30 μm to prepare Coating solution (HC-1) for hardcoat layer.

Composition of Coating Solution (HC-1) for Hardcoat Layer

| | |
|---|---|
| UV-1700B (binder, produced by The Nippon Synthetic Chemical Industry Co., Ltd.) | 37.8 parts by weight |
| Ethanol (solvent) | 61.4 parts by weight |
| IRGACURE 184 (polymerization initiator, produced by Ciba Specialty Chemicals Inc.) | 1.2 parts by weight |

<Formation of Hardcoat Layer>

Coating solution (HC-1) for hardcoat layer was coated on the surface of cellulose acylate film which had been in contact with the metal support in the film formation as described above by a microgravure coating process at a transporting speed of 30 m/min. After drying at 60° C. for 150 seconds, the coating layer was cured by irradiating an ultraviolet ray at an illuminance of 400 mW/cm$^2$ and an irradiation dose of 150 mJ/cm$^2$ using an air cooling metal halide lamp (produced by Eye Graphics Co., Ltd.) of 160 W/cm with nitrogen purge (an oxygen concentration of 0.5% or less) to form a hardcoat layer.

As to the resulting protective film for polarizing plate with the hardcoat layer, the pencil harness was measured in the manner described below.

The pencil hardness evaluation described in JIS K 5400 was conducted. Specifically, the protective film for polarizing plate with the hardcoat layer was subjected to humidity conditioning at a temperature of 25° C. and humidity of 60% RH for 2 hours, and the evaluation was conducted on the hardcoat side using a 3H grade test pencil prescribed in JIS S 6006 under a load of 500 g according to the criteria shown below.

A: Under the evaluation of n=10, a number of scratches was from 0 to 2.

B: Under the evaluation of n=10, a number of scratches was from 3 to 7.

C: Under the evaluation of n=10, a number of scratches was from 8 to 10.

The results obtained are shown in Table 1 below. From the results shown in Table 1, it can be seen that the protective films for polarizing plate according to the invention are excellent in the scratch resistance in comparison with the protective films for polarizing plate of the comparative examples.

[Production of Liquid Crystal Display Device]

Two polarizing plates were peeled away from a commercially-available IPS mode liquid crystal television set, and Polarizing plates 101 according to the invention were stuck through an adhesive to the viewer side and the backlight side of the device, respectively. The polarizing plates were arranged in a cross-Nicol configuration where the transmission axis of the polarizing plate on the viewer side was set in the vertical direction and the transmission axis of the polarizing plate on the backlight side was set in the horizontal direction. The polarizing plates for Examples 102 to 113 and 301 to 305 and Comparative Examples 201 to 208 were also stuck onto the liquid crystal display device, respectively, in the same manner as above.

(Evaluation of Display Unevenness)

After preservation of the liquid crystal display device thus produced at 60° C. and 90% relative humidity for 48 hours, the display unevenness of panel was evaluated according the criteria shown below. The results obtained are shown in Table 1.

A: The unevenness was not occurred (the area where the unevenness occurred was 0%).

B: The area where the unevenness occurred was larger than 0% and less than 10%.

C: The area where the unevenness occurred was 10% or more.

TABLE 1

| | Resin | Ultraviolet Absorbing Agent A Kind | Ultraviolet Absorbing Agent A Straight-chain Alkyl Group Having 8 Or More Carbon Atoms | Ultraviolet Absorbing Agent A Addition Amount* (parts by weight) | Ultraviolet Absorbing Agent B Kind | Ultraviolet Absorbing Agent B Straight-chain Alkyl Group Having 8 Or More Carbon Atoms | Ultraviolet Absorbing Agent B Addition Amount* (parts by weight) | Hardness Increasing Agent 1 Kind | Hardness Increasing Agent 1 Addition Amount* (parts by weight) | Hardness Increasing Agent 2 Kind | Hardness Increasing Agent 2 Addition Amount* (parts by weight) | Total Addition Amount of Ultraviolet Absorbing Agent* (parts by weight) | Thickness (μm) |
|---|---|---|---|---|---|---|---|---|---|---|---|---|---|
| Example 101 | Cellulose Acetate | (S-12) | Absent | 1.0 | (A-01) | Absent | 2.1 | (7) | 5.0 | (15) | 5.0 | 3.1 | 30 |
| Example 102 | Cellulose Acetate | (S-12) | Absent | 1.5 | (A-01) | Absent | 2.1 | (7) | 5.0 | (15) | 5.0 | 3.6 | 30 |
| Example 103 | Cellulose Acetate | (S-12) | Absent | 3.0 | (A-01) | Absent | 1.4 | (7) | 5.0 | (15) | 5.0 | 4.4 | 30 |
| Example 104 | Cellulose Acetate | (S-12) | Absent | 3.4 | (A-01) | Absent | 1.4 | (7) | 5.0 | (15) | 5.0 | 4.8 | 20 |
| Example 105 | Cellulose Acetate | (S-01) | Absent | 3.0 | (A-01) | Absent | 1.4 | (7) | 5.0 | (15) | 5.0 | 4.4 | 30 |
| Example 106 | Cellulose Acetate | (S-12) | Absent | 1.0 | UV-9 | Absent | 3.4 | (7) | 5.0 | (15) | 5.0 | 4.4 | 30 |
| Example 107 | Cellulose Acetate | (S-12) | Absent | 1.0 | B-1 | Absent | 2.4 | (7) | 5.0 | (15) | 5.0 | 3.4 | 30 |
| Example 108 | Cellulose Acetate | (11) | Absent | 0.5 | (A-01) | Absent | 2.4 | (7) | 5.0 | (15) | 5.0 | 2.9 | 26 |
| Example 109 | Cellulose Acetate | (S-12) | Absent | 0.5 | (A-01) | Absent | 2.1 | (7) | 5.0 | (15) | 5.0 | 2.6 | 25 |
| Example 110 | Cellulose Acetate | (S-12) | Absent | 1.0 | (A-01) | Absent | 1.4 | (7) | 5.0 | (15) | 5.0 | 2.4 | 30 |
| Example 111 | Cellulose Acetate | (S-12) | Absent | 0.5 | (A-01) | Absent | 2.1 | (7) | 5.0 | (15) | 5.0 | 2.6 | 40 |
| Example 112 | Cellulose Acetate | (11) | Absent | 1.2 | C-1 | Absent | 3.6 | (7) | 5.0 | (15) | 5.0 | 4.8 | 35 |
| Example 113 | Cellulose Acetate | (S-12) | Absent | 3.4 | (A-01) | Absent | 1.4 | None | 0.0 | None | 0.0 | 4.8 | 20 |
| Example 301 | Cellulose Acetate | (11) | Absent | 1.5 | C-1 | Absent | 3.4 | (A-2) | 10.0 | None | 0.0 | 4.9 | 10 |
| Example 302 | Cellulose Acetate | (11) | Absent | 1.0 | C-1 | Absent | 2.9 | (A-2) | 10.0 | None | 0.0 | 3.9 | 15 |
| Example 303 | Cellulose Acetate | (11) | Absent | 1.5 | C-1 | Absent | 3.4 | (A-2) | 10.0 | None | 0.0 | 4.9 | 6 |

TABLE 1-continued

| | | | | | | | | | | | | | |
|---|---|---|---|---|---|---|---|---|---|---|---|---|---|
| Example 304 | Cellulose Acetate | (11) | Absent | 1.2 | C-1 | Absent | 2.4 | (A-2) | 10.0 | None | 0.0 | 3.6 | 20 |
| Example 305 | Cellulose Acetate | (11) | Absent | 1.2 | (A-01) | Absent | 2.4 | (A-2) | 10.0 | None | 0.0 | 3.6 | 20 |
| Comparative Example 201 | Cellulose Acetate | None | Absent | 0.0 | UV-9 | Absent | 5.1 | (7) | 5.0 | (15) | 5.0 | 5.1 | 26 |
| Comparative Example 202 | Cellulose Acetate | (S-12) | Absent | 1.0 | (A-01) | Absent | 1.2 | (7) | 5.0 | (15) | 5.0 | 2.2 | 30 |
| Comparative Example 203 | Cellulose Acetate | (S-32) | Present | 3.0 | (A-01) | Absent | 1.4 | (7) | 5.0 | (15) | 5.0 | 4.4 | 30 |
| Comparative Example 204 | Cellulose Acetate | (11) | Absent | 1.2 | C-2 | Present | 3.6 | (7) | 5.0 | (15) | 5.0 | 4.8 | 35 |
| Comparative Example 205 | Cellulose Acetate | (S-12) | Absent | 1.5 | (A-01) | Absent | 2.1 | TPP | 10.0 | (15) | 5.0 | 3.6 | 30 |
| Comparative Example 206 | Cellulose Acetate | (S-12) | Absent | 1.0 | C-2 | Present | 3.4 | (7) | 5.0 | (15) | 5.0 | 4.4 | 30 |
| Comparative Example 207 | Cellulose Acetate | (S-12) | Absent | 1.0 | (A-02) | Present | 3.4 | (7) | 5.0 | (15) | 5.0 | 4.4 | 30 |
| Comparative Example 208 | Cellulose Acetate | (11) | Absent | 1.2 | C-2 | Present | 3.6 | None | 0.0 | None | 0.0 | 4.8 | 20 |

| | Transmittance of Film (%) | | | Haze | Knoop Hardness | Film Thickness/Water Vapor Transmission Rate | Light Fastness of | | Display Unevenness (60° C., 90% RH |
|---|---|---|---|---|---|---|---|---|---|
| | 380 nm | 300 nm | B* | (%) | ($N/mm^2$) | ($\mu m/g/m^2$) | Polarizing Plate | Pencil Hardness | for 48 hours) |
| Example 101 | 0.72 | 0.02 | 0.38 | 0.25 | 218 | 0.028 | A | B | B |
| Example 102 | 0.08 | 0.01 | 0.44 | 0.24 | 224 | 0.026 | A | A | B |
| Example 103 | 0.02 | 0.01 | 0.55 | 0.24 | 236 | 0.024 | A | A | B |
| Example 104 | 0.03 | 0.02 | 0.44 | 0.20 | 242 | 0.020 | A | A | A |
| Example 105 | 0.02 | 0.01 | 0.55 | 0.24 | 220 | 0.024 | A | B | B |
| Example 106 | 0.72 | 0.05 | 0.38 | 0.23 | 212 | 0.023 | A | B | B |
| Example 107 | 0.72 | 0.14 | 0.38 | 0.24 | 215 | 0.026 | A | B | B |
| Example 108 | 1.98 | 0.02 | 0.65 | 0.29 | 217 | 0.024 | A | B | B |
| Example 109 | 3.9 | 0.02 | 0.3 | 0.20 | 217 | 0.026 | B | B | B |
| Example 110 | 0.75 | 0.14 | 0.36 | 0.23 | 218 | 0.029 | B | B | B |
| Example 111 | 1.90 | 0.00 | 0.43 | 0.34 | 217 | 0.035 | A | B | C |
| Example 112 | 0.27 | 0.03 | 0.69 | 0.49 | 216 | 0.033 | A | B | B |
| Example 113 | 0.03 | 0.02 | 0.42 | 0.20 | 210 | 0.049 | A | B | B |
| Example 301 | 1.1 | 0.5 | 0.67 | 0.68 | 216 | 0.026 | A | B | B |
| Example 302 | 1.1 | 0.2 | 0.65 | 0.54 | 212 | 0.031 | A | B | B |
| Example 303 | 3.9 | 0.14 | 0.65 | 0.35 | 219 | 0.023 | B | B | B |
| Example 304 | 0.3 | 0.05 | 0.68 | 0.45 | 210 | 0.033 | A | B | B |
| Example 305 | 0.3 | 0.03 | 0.35 | 0.24 | 214 | 0.020 | A | B | B |
| Comparative Example 201 | 4.1 | 0.00 | 0.20 | 1.03 | 212 | 0.020 | C | B | B |

TABLE 1-continued

| | | | | | | | | | |
|---|---|---|---|---|---|---|---|---|---|
| Comparative Example 202 | 0.80 | 0.15 | 0.36 | 0.26 | 217 | 0.035 | C | B | B |
| Comparative Example 203 | 0.02 | 0.01 | 0.55 | 0.24 | 206 | 0.037 | A | C | C |
| Comparative Example 204 | 0.27 | 0.03 | 0.69 | 0.49 | 203 | 0.036 | A | C | C |
| Comparative Example 205 | 0.08 | 0.01 | 0.43 | 0.23 | 173 | 0.030 | A | C | B |
| Comparative Example 206 | 0.72 | 0.00 | 0.38 | 0.23 | 204 | 0.039 | A | C | C |
| Comparative Example 207 | 0.72 | 0.08 | 0.38 | 0.44 | 201 | 0.040 | A | C | C |
| Comparative Example 208 | 0.32 | 0.04 | 0.60 | 0.4 | 196 | 0.056 | C | C | C |

*Addition amount relative to 100 parts by weight of cellulose acylate
In Table 1 above, TPP denotes triphenyl phosphate.

What is claimed is:

1. A protective film for polarizing plate, the protective film comprising:

a resin;

an ultraviolet absorbing agent A having an absorption maximum in a wavelength range of from 350 to 400 nm;

an ultraviolet absorbing agent B having an absorption maximum in a wavelength range of from 270 to 330 nm; and a compound represented by the following formula (I):

Formula (I)

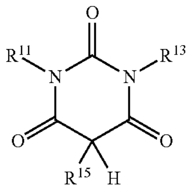

wherein $R^{11}$, $R^{13}$ and $R^{15}$ each independently represents a hydrogen atom, an alkyl group having from 1 to 20 carbon atoms, a cycloalkyl group having from 3 to 20 carbon atoms, an alkenyl group having from 2 to 20 carbon atoms or an aromatic group having from 6 to 20 carbon atoms, provided that a total of 3 or more ring structures are present in $R^{11}$, $R^{13}$ and $R^{15}$, and wherein a content of the ultraviolet absorbing agent A is from 0.1 to 5% by weight relative to the resin, a content of the ultraviolet absorbing agent B is from 0.1 to 5% by weight relative to the resin, and the protective film fulfills the following requirements (a) to (d):

(a) a thickness of the protective film is from 5 to 40 μm, (b) a transmittance of the protective film at a wavelength of 300 nm is 2% or less, (c) a transmittance of the protective film at a wavelength of 380 nm is 4% or less, (d) a surface hardness of the protective film measured by using a Knoop indenter at an indentation load of 50 mN is 210 $N/mm^2$ or more.

2. The protective film for polarizing plate as claimed in claim 1, wherein both the ultraviolet absorbing agent A and the ultraviolet absorbing agent B do not have a straight-chain alkyl group having 8 or more carbon atoms.

3. The protective film for polarizing plate as claimed in claim 1, wherein the resin is a cellulose acylate.

4. The protective film for polarizing plate as claimed in claim 1, wherein the ultraviolet absorbing agent A is a compound represented by the following formula (1):

Formula (1)

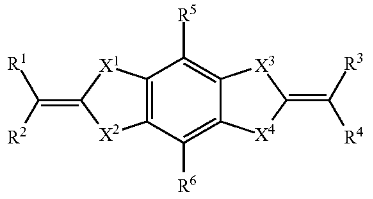

wherein $R^1$, $R^2$, $R^3$ and $R^4$ each independently represents a hydrogen atom or a monovalent substituent, $R^5$ and $R^6$ each independently represents a hydrogen atom or a monovalent substituent, and $X^1$, $X^2$, $X^3$ and $X^4$ each independently represents a hetero atom.

5. The protective film for polarizing plate as claimed in claim 1, wherein the ultraviolet absorbing agent A is a compound represented by the following formula (4):

Formula (4)

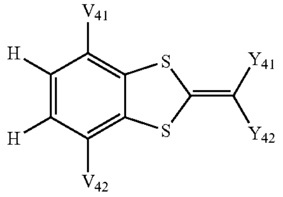

wherein $Y_{41}$ and $Y_{42}$ each independently represents a hydrogen atom or a monovalent substituent, and $V_{41}$ and $V_{42}$ each independently represents a hydrogen atom or a monovalent substituent.

6. The protective film for polarizing plate as claimed in claim 1, wherein the ultraviolet absorbing agent B is a benzotriazole compound, a benzophenone compound or a triazine compound.

7. The protective film for polarizing plate as claimed in claim 1, wherein a chromaticness index b* of the protective film in a L*a*b* color system is from 0.1 to 0.7.

8. A polarizing plate comprising at least one of the protective film as claimed in claim 1.

9. A liquid crystal display device comprising at least one of the polarizing plate as claimed in claim 8.

10. The protective film for polarizing plate as claimed in claim 1, wherein a content of the compound represented by the formula (I) in the protective film for polarizing plate is 2% by weight to 20% by weight based on a content of the resin constituting the protective film for polarizing plate.

* * * * *